United States Patent
Buijssen et al.

(10) Patent No.: US 9,169,419 B2
(45) Date of Patent: Oct. 27, 2015

(54) POWDER COATING COMPOSITION COMPRISING A POLYESTER AND A β-HYDROXYALKYLAMIDE AS CROSSLINKER

(75) Inventors: Paulus Franciscus Anna Buijssen, Maassluis (NL); Johannes Marius Paauwe, Zwolle (NL); Cinderella Posthuma-Van-Tent, Steenwijk (NL); Hendrik Johannes Verhoef, Ijsselmuiden (NL); Juul Cuijpers, Zwolle (NL)

(73) Assignee: DSM IP ASSETS B.V., Heerlen (NL)

( * ) Notice: Subject to any disclaimer, the term of this patent is extended or adjusted under 35 U.S.C. 154(b) by 1007 days.

(21) Appl. No.: 13/257,409

(22) PCT Filed: Mar. 25, 2010

(86) PCT No.: PCT/EP2010/053957
§ 371 (c)(1),
(2), (4) Date: Nov. 30, 2011

(87) PCT Pub. No.: WO2010/094811
PCT Pub. Date: Aug. 26, 2010

(65) Prior Publication Data
US 2012/0070630 A1    Mar. 22, 2012

(30) Foreign Application Priority Data

Mar. 27, 2009 (EP) .................................. 09156530
Mar. 27, 2009 (EP) .................................. 09156535
Mar. 27, 2009 (EP) .................................. 09156537

(51) Int. Cl.
| | |
|---|---|
| C08G 63/60 | (2006.01) |
| B32B 27/06 | (2006.01) |
| C08G 63/44 | (2006.01) |
| C09D 167/00 | (2006.01) |
| C08L 67/00 | (2006.01) |
| C09D 5/03 | (2006.01) |
| C08K 5/20 | (2006.01) |

(52) U.S. Cl.
CPC ............. *C09D 167/00* (2013.01); *C08L 67/00* (2013.01); *C09D 5/037* (2013.01); *C08K 5/20* (2013.01); *Y10T 428/24802* (2015.01)

(58) Field of Classification Search
None
See application file for complete search history.

(56) References Cited

U.S. PATENT DOCUMENTS

| 5,880,223 A | 3/1999 | Shah et al. |
|---|---|---|
| 6,284,845 B1 | 9/2001 | Panandiker et al. |
| 2004/0071955 A1* | 4/2004 | Moens et al. ................. 428/327 |

FOREIGN PATENT DOCUMENTS

| EP | 1980582 | 10/2008 |
|---|---|---|
| WO | WO 94/11451 | 5/1994 |
| WO | WO 02/085999 | 10/2002 |
| WO | 03/004575 | 1/2003 |
| WO | WO 2008/135209 | * 11/2008 |

OTHER PUBLICATIONS

International Search Report for PCT/EP2010/053957 mailed Jun. 25, 2010.

* cited by examiner

*Primary Examiner* — Susannah Chung
*Assistant Examiner* — Robert T Butcher
(74) *Attorney, Agent, or Firm* — Nixon & Vanderhye P.C.

(57) ABSTRACT

The invention relates to a thermosetting powder coating composition comprising a crosslinker and a polyester, wherein the polyester has functional groups which functional groups are capable of reacting with β-hydroxyalkylamide groups, wherein the polyester is prepared from at least the following monomers: neopentylglycol, a difunctional alcohol other than neopentylglycol; isophthalic acid, terephthalic acid, optionally adipic acid and a branching monomer chosen from the group of an at least trifunctional carboxylic acid, an at least trifunctional alcohol, an at least trifunctional hydroxy carboxylic acid and mixtures thereof, wherein the amount of difunctional alcohol other than neopentylglycol in the polyester ranges from 1 to 50% w/w based on the polyester, wherein the amount of isophthalic acid in the polyester ranges from 6 to 35% w/w based on the polyester, wherein the polyester has a functionality of at least 2.1, wherein the crosslinker is a compound having β-hydroxyalkylamide groups. This thermosetting powder coating composition has the ability to be cured at low temperature, while at the same time being able provide powder coatings having at least two of the following three properties: limited blooming to no blooming, an acceptable smoothness, sufficient impact resistance.

61 Claims, No Drawings

POWDER COATING COMPOSITION COMPRISING A POLYESTER AND A β-HYDROXYALKYLAMIDE AS CROSSLINKER

This application is the U.S. national phase of International Application No. PCT/EP2010/053957 filed 25 Mar. 2010 which designated the U.S. and claims priority to EP 09156530.9 filed 27 Mar. 2009, EP 09156535.8 filed 27 Mar. 2009, and EP 09156537.4 filed 27 Mar. 2009, the entire contents of each of which are hereby incorporated by reference.

The present invention relates to a thermosetting powder coating composition comprising a polyester with functional groups capable of reacting with β-hydroxyalkylamide groups and a compound having β-hydroxyalkylamide groups.

The invention also relates to a powder coating obtained by cure preferably thermal cure, of the aforementioned thermosetting powder coating composition, a powder coating prepared from said thermosetting powder coating composition and a substrate partially or fully coated with the powder coating. The invention also relates to the use of the thermosetting powder coating composition to coat substrates. The invention also relates to a process for preparing the thermosetting powder coating composition and a process for coating the substrate with said thermosetting powder coating composition.

As shown by the article "Overview of the powder coatings market worldwide" by G. Maggiore in Pitture e Vernice Europe 1/92, pp. 15-22 and by the lecture by D. Richert "Powder Coating: Current Developments, Future Trends" (Waterborne, High-Solids and Powder Coatings Symposium, Feb. 22-24, 1995), the search is still continuing for thermosetting powder coating compositions which can be cured with little thermal stress of the substrate and which consequently are suitable for use on heat-sensitive substrates such as, for example, wood and plastic.

A decrease in temperature at which a thermosetting powder coating composition can be cured is desired as this is both economically and technically advantageous. A decrease in cure temperature, while keeping the cure time constant, reduces the energy consumption, which is beneficial both from an ecological and an economical point of view, rendering at the same time this type of thermosetting powder coating compositions attractive to powder coaters since the throughput of their powder coating lines may also be significantly increased. Furthermore, due to a decrease of cure temperature, also heat-sensitive substrates may be used, thereby broadening the field of application for such thermosetting powder coating composition.

Therefore, there is a desire for a thermosetting powder coating composition that has the ability to be cured at a low temperature of for example in the range of from 80 up to and including 225° C., preferably for times of up to and including 60 minutes. Besides the desire for a thermosetting powder coating composition that can be cured at low temperature (also referred to herein as low bake) it may also be desired that the powder coatings prepared therefrom using low bake present an array of properties.

Powder coatings resulting from thermosetting powder coating compositions which have been cured at a low temperature may display poor physical and/or mechanical properties such as for example poor smoothness, blooming and/or poor reverse impact resistance due to inadequate cure. Particularly, the development of surface haze due to blooming may become a significant problem. Blooming usually manifests itself as surface haze which is usually inspected by the naked eye and assessed qualitatively. The range at which deposition of white or off-white material occurs and manifests as surface haze is reported. This visual inspection may be carried out on either white or dark colored coatings. According to Focus on Powder Coatings, vol. 2003 (6), June 2003, p. 3-4 and the reference to the paper entitled "The Development of Non-blooming Polyester Resin and its Application to Low Temperature Cure Powder Coatings" by Navin Shah and Edward Nicholl of Rohm & Haas Powder Coatings, presented at the International Waterborne, High Solids and Powder Coatings Symposium held in New Orleans on 26-28 Feb. 2003, blooming of a polyester has been attributed to the presence of a 22-member cyclic oligomer formed by the condensation of two molecules of terephthalic acid and two molecules of neopentyl glycol. This 22-member cyclic oligomer possesses a crystalline melting temperature of about 275-280° C. and normally does not volatize at low curing temperatures, for instance curing temperatures ranging from 120° C. to 160° C.

Thermosetting powder coating compositions wherein blooming of the resulting powder coating after low temperature cure of the thermosetting powder coating compositions, does not occur are for example described in WO 03/004574. The latter discloses a thermosetting powder coating composition comprising a polyester and an epoxy group containing cure agent, wherein the polyester is based on a polyol and a polyacid, wherein the isophthalic acid content on polyacid is from 80 to 100 mol %.

Another example of a thermosetting powder coating composition wherein blooming of the resulting powder coating after low temperature cure of the thermosetting powder coating composition is limited, is for example described in U.S. Pat. No. 5,880,223. U.S. Pat. No. 5,880,223 discloses a coating powder comprising a polyester resin and an epoxy crosslinker. The polyester resin is based on the monomer 2-butyl-2-ethyl-1,3-propane diol to reduce or eliminate blooming of the cured coating when said cured coating is exposed to a temperature of 107° C. for a period of 12 hours.

Epoxy crosslinkers when used in pure epoxy thermosetting powder coating compositions are known for their protective properties and excellent chemical and corrosion resistance. Unfortunately, they also suffer from discoloration under UV light exposure and insufficient outdoor durability. TGIC (triglycidyl isocyanurate) is an epoxy crosslinker that is popular for thermosetting powder coating compositions, in particular in combination with polyesters, since the powder coatings resulting from curing of TGIC/polyester thermosetting powder coating compositions have overall good performance even though their flexibility and corrosion resistance is inferior to that of typical epoxy-based thermosetting powder coating compositions. However, TGIC is a known mutagenic (CEPE-Safe Powder Guide 7$^{th}$ Edition, 2005) and bisphenol-A epoxies are suspected to be carcinogenic.

Therefore, there is a desire to replace epoxy crosslinkers in thermosetting powder coating compositions and powder coatings.

One attractive group of alternative crosslinkers are the compounds having β-hydroxyalkylamide groups, examples of which are commercialized by EMS Chemie as PRIMID® crosslinkers. Thermosetting powder coating compositions using as a crosslinker, compounds having β-hydroxyalkylamide groups generally display good outdoor durability in powder coatings prepared therefrom and are neither mutagenic nor carcinogenic and are thus preferred over epoxy-based thermosetting powder coating compositions. Therefore, cure with a β-hydroxyalkylamide crosslinker is desired.

Low bake is particularly challenging for thermosetting powder coating compositions wherein the crosslinker is a compound having β-hydroxyalkylamide groups. Compounds having β-hydroxyalkylamide groups usually present relatively high melting points e.g. typically higher than 110-120° C. The closer the melting temperature of a component such as the crosslinker in thermosetting powder coating compositions is to the cure temperature, the more difficult it is to obtain, a powder coating having for example sufficient reverse impact resistance, acceptable smoothness or limited to no blooming, at a relatively short curing time, for instance a curing time of up to 30 minutes. These difficulties may already occur at temperatures of as low as 140-155° C. for practically desired/applied cure times such as any time up to 30 min.

U.S. Pat. No. 6,284,845 discloses a powder coating composition which includes a carboxyl terminated polyester, epoxy compounds and onium catalyst or β-hydroxyalkylamide. However, due to the presence of a linear polyester in the powder coating composition the impact resistance is insufficient at low curing temperatures.

Furthermore, in case of thermosetting powder coating compositions wherein the crosslinker is a compound having β-hydroxyalkylamide groups, it is known to the skilled person that combining low temperature cure and attractive powder coating properties such as those mentioned here above is even more difficult to achieve in comparison to other types of crosslinkers such as epoxy compounds of monomeric or polymeric nature having oxirane rings (oxirane is a cyclic ether with only three ring atoms). The reason is that the speed of cure of epoxy compounds may be controlled via appropriate catalysts e.g. phosphonium salts, tertiary amines, ammonium salts, benzyl trimethyl ammonium chloride, imidazole, 1-methylimidazole, 2-methylimidazole, benzotriazoles, choline chloride. To this date, no catalyst compound has been found that would allow control over the cure speed of a thermosetting powder coating composition comprising a carboxylic acid or carboxylic acid anhydride functional polyester and a compound having β-hydroxyalkylamide groups.

Therefore, it is the object of the invention to provide a thermosetting powder coating composition comprising a polyester with functional groups capable of reacting with β-hydroxyalkylamide groups and a compound having β-hydroxyalkylamide groups, said thermosetting powder coating composition being suitable for low bake (curing temperatures in the range of from 80 up to and including 225° C., preferably for times of up to 60 minutes, for example at 155° C. for 15 minutes or at 140° C. for 30 minutes) which composition provides a powder coating that has at least two of the following three coating properties: limited to no blooming, sufficient reverse impact resistance and acceptable smoothness.

This object is achieved by a thermosetting powder coating composition comprising a crosslinker and a polyester
wherein the polyester has functional groups which functional groups are capable of reacting with β-hydroxyalkylamide groups,
wherein the polyester is prepared from at least the following monomers: neopentylglycol, a difunctional alcohol other than neopentylglycol; isophthalic acid, terephthalic acid, optionally adipic acid and a branching monomer chosen from the group of an at least trifunctional carboxylic acid, an at least trifunctional alcohol, an at least trifunctional hydroxy carboxylic acid and mixtures thereof,
wherein the amount of difunctional alcohol other than neopentylglycol in the polyester ranges from 1 to 50% w/w based on the polyester,
wherein the amount of isophthalic acid in the polyester ranges from 6 to 35 w/w based on the polyester,
wherein the polyester has a functionality of at least 2.1,
wherein the crosslinker is a compound having β-hydroxyalkylamide groups.

The thermosetting powder coating compositions of the present invention have the ability to be cured at temperatures as low as 145° C., preferably 140° C. for at most 30 minutes, preferably at most 15 minutes to afford powder coatings that have at least two of the following three coating properties: sufficient reverse impact resistance, acceptable smoothness and limited to no blooming.

Additional advantages of the thermosetting powder coating composition of the present invention may be that the thermosetting powder coating composition has an improved cost-effectiveness and/or an improved storage stability [equal or higher to 6, on a scale from 1 (very poor storage stability) up to 10 excellent storage stability] as measured using DIN 55 990-7 at 40° C. after 28 days.

Furthermore, the thermosetting powder coating composition of the present invention upon curing at temperatures in the range of from 140 to 225° C. for a curing time in the range of from 30 seconds to 60 minutes may provide powder coatings having an improved (equal or higher to 100 μm) degassing limit (measured as described herein), gloss (measured at 20° or 60° specular gloss using ASTM D523), haze (measured using ASTM D523 and as described herein), adhesion (measured according to ISO 2409, "Gitterschnitt" test), flexibility [measured according to ISO 1519 [bend test (cylindrical Mandrell)], an improved blanching (measured as described herein wherein ΔL* is equal or lower to 1.4 and ΔE* is equal or lower to 1.4), improved yellowing resistance (as measured herein), good degassing limit (measured according to ASTM D 714), and/or an improved outdoor durability (measured according to ASTM G53-88). Also, the powder coatings prepared by low bake of the thermosetting powder coating composition of the present invention may have less surface defects, such as for example pinholes, craters, blisters, etc.

By "powder" is meant herein, a collection of solid particles wherein the individual particles have a maximum particle size of at most 100 μm at 23° C., for example a particle size of at most 90 μm at 23° C.

In the context of the present invention, with 'thermosetting powder coating composition' is meant a mixture of components that form a powder-like material which mixture is solid or semi-solid at room temperature and which mixture has the ability to form an irreversibly crosslinked network (the so-called 'cured form'). In the thermosetting powder coating composition of the present invention, crosslinking will proceed via the formation of permanent covalent bonds through chemical reactions between functional groups of the polyester having functional groups that are capable of reacting with β-hydroxyalkylamide groups and the crosslinker (commonly also referred to as curing agent or curative), which is a compound having β-hydroxyalkylamide groups. If other resins should also be present in the thermosetting powder coating composition of the present invention, their functional groups—if capable of reacting with β-hydroxyalkylamide groups—may also react with the crosslinker. As a result of these crosslinking reactions, the cured form of the thermosetting powder coating composition (crosslinked thermosetting powder coating composition) becomes "set" material, that is, a material that can no longer flow or be molten.

The term 'powder coating' as used herein is the partially or fully cured (crosslinked) form of the thermosetting powder coating composition of the invention. In other words the powder coating derives upon partial or full cure of the thermosetting powder coating composition.

In the context of the present invention, the polyester having functional groups that are capable of reacting with β-hydroxyalkylamide groups, is referred to as 'the polyester'. The functional groups of the polyester that are capable of reacting with β-hydroxyalkylamide groups, are terminal groups (=end-groups) which are located at the end(s) of the polyester's macromolecular structure (including terminal groups on side chains which side chains form part of the main and longer—when compared to side chains—macromolecular chain) of each polyester molecule. In case of a carboxylic acid functional polyester, the functional groups of the polyester that are capable of reacting with hydroxyalkylamide groups are carboxylic acid or carboxylic acid anhydride terminal groups.

Cure is used interchangeably with the terms crosslinking or curing in the present invention whilst powder coating is the object derived upon cure of the thermosetting powder coating composition of the present invention. By "curing" is meant herein the process of becoming "set" material.

Heat cure is used interchangeably with the term thermal cure in the present invention. Preferably, curing of the thermosetting powder coating composition takes place using thermal energy (heat cure) only. In the context of the invention the term thermal energy does not include UV- or electron beam induced curing.

In the context of the present invention, with functionality (f) of the polyester is meant the mean amount of functional groups capable of reacting with β-hydroxyalkylamide groups per molecule of the polyester. The functionality f for the polyester having a certain $M_n$ (theoretical value) and acid value (AV), is calculated according to the following equation:

$$f=(M_n \times AV)/56110$$

The number average molecular weight ($M_n$) is defined as follows:

$$M_n=(\Sigma_i N_i M_i)/(\Sigma_i N_i)$$

where $N_i$ is the number of molecules of molecular weight $M_i$.

The $M_n$ (theoretical value) is calculated by multiplying the targeted functionality (f) with 56110 and dividing the outcome thereof by the targeted acid value (AV) (mg KOH/g of the polyester) according to the following equation:

$$M_n=(56110 \times f)/AV$$

In the context of the present invention, by carboxylic acid functional polyester is meant a polyester having an acid value higher than the hydroxyl value. Generally, a carboxylic acid functional polyester has an acid value between 15 and 120 mg KOH/g polyester whilst the hydroxyl value of the polyester is less than 14 mg KOH/g polyester. The acid (AV) and hydroxyl value (OHV) of a polyester are measured titrimetrically according to ISO 2114-2000 and ISO 4629-1978, respectively.

In the context of the present invention, with "a powder coating that shows no blooming" or a "blooming-free powder coating" is meant a powder coating that presents no blooming if prepared from a thermosetting powder coating composition cured at a temperature higher than 145° C., preferably higher than 140° C. as measured using the assessment as described herein. With 'blooming' is meant the phenomenon of the formation of a white or off-white powder or crust on the surface of a coating during cure. The blooming was assessed qualitatively via the naked eye. An AlMg3 type of panel was coated with a white thermosetting powder coating composition of the invention and the coating derived upon curing of the powder coating in a gradient oven, set from 100 to 200° C. for 30 min, was visually inspected. The blooming can be seen as a surface haze over the coating and the temperature range where blooming occurs is reported. The extent of blooming was assessed as: a) no blooming, b) limited blooming and c) extensive blooming. For the thermosetting powder coating compositions of the invention, their corresponding powder coatings presenting no blooming at curing temperatures higher than 145° C., preferably higher than 140° C. are preferred.

In literature, the term smoothness is also referred to as flow. The smoothness of the powder coatings derived upon full cure of the corresponding thermosetting powder coating compositions of the present invention was determined by comparing the smoothness of the coating with PCI Powder Coating Smoothness panels (ACT Test Panels Inc., APR22163 (A) Batch: 50708816) at a thickness of approximately 60 μm. The rating of smoothness is from 1 to 10, with 1 representing the roughest coating and 10 representing the smoothest coating. For the thermosetting powder coating compositions of the invention, their corresponding powder coatings presenting smoothness equal or higher to 4, are desirable. As presented herein, acceptable smoothness of a powder coating is a smoothness of at least PCI 4.

Reverse impact resistance (RIR) (inch/lbs, 1 inch/lbs=0.055997 m/kg) of a powder coating obtained by curing of a thermosetting powder coating composition at a certain temperature and time, is defined as the ability of a 75 μm thick powder coating prepared from the thermosetting powder coating composition of the invention on ALQ-46 panels of 0.8 mm thickness to withstand impact of 60 inch/lbs as measured using a ⅝" ball ("pass" according to ASTM D 2794). RIR is measured using ASTM D2794 according to the method as described herein. With sufficient reverse impact resistance of a powder coating is meant that the powder coatings prepared from the thermosetting powder coating composition of the present invention withstands the reverse impact resistance test (as described herein) when cured for only 15 minutes and preferably also when cured for only 12 minutes at 155° C.

In the context of the present invention, the curing time and curing temperature are selected such that the powder coating withstands 60 inch/lbs using the method for measuring RIR as described herein.

For all upper and lower boundaries of any parameters given herein, the boundary value is included in each range for each parameter. All combinations of minimum and maximum values of the parameters described herein may be used to define the parameter ranges for various embodiments and preferences of the invention.

Polyesters suitable for use in the thermosetting powder coating composition of the present invention may for example be based on a condensation reaction between alcohol functional monomers and carboxylic acid functional monomers. The polyester may be prepared according to conventional procedures by esterification or transesterification, optionally in the presence of customary esterification catalysts for example dibutyltin oxide or tetrabutyl titanate. The preparation conditions and the COOH/OH ratio may be selected so as to obtain end products that have an acid number and/or a hydroxyl number within the targeted range of values.

The polyester has at least one glass transition temperature ($T_g$) and may additionally have a melting temperature ($T_m$), preferably the polyester does not have a $T_m$. Both the $T_g$ and the $T_m$ are measured via DSC according to the method described herein. Preferably, the polyester has a $T_g$ of at most 120° C., more preferably of at most 100° C., even more preferably of at most 90° C., most preferably of at most 85°

C., for example of at most 80° C., for example of at most 75° C., for example of at most 70° C. Preferably, the $T_g$ of the polyester is at least 20° C., more preferably at least 35° C., even more preferably at least 40° C. most preferably at least 45° C., for example at least 50° C.

The polyester has functionality of at least 2.1, more preferably of at least 2.2, even more preferably of at least 2.25, even more preferably of at least 2.35, most preferably of at least 2.5. Preferably the polyester has functionality of at most 4.0, more preferably of at most 3.0, even more preferably of at most 2.8, even more preferably of at least 2.75, even more preferably of at most 2.65, for example of at most 2.6. The functionality is controlled by the amount of branching monomer from which the polyester is prepared. The functionality of the polyester has an effect on the curing temperature and time of the thermosetting powder coating composition. Choosing the functionality of the polyester at a value within the preferred ranges as indicated above, may provide powder coatings having an (even further) improved smoothness and/or improved mechanical properties, such as for instance reverse impact resistance and/or flexibility.

The number average molecular weight ($M_n$) (theoretical value) of the polyester may be for example in the range from 1000 to 10000 g/mol. Preferably the $M_n$ of the polyester ranges from 1200 to 8000 g/mol and most preferably the $M_n$ of the polyester ranges from 1400 to 7500 g/mol, for example the $M_n$ of the polyester ranges from 1450 to 7000 g/mol, for example the $M_n$ of the polyester ranges from 1500 to 6500 g/mol, for example the $M_n$ of the polyester ranges from 1600 to 6400 g/mol, for example the $M_n$ of the polyester ranges from 1700 to 6300 g/mol, for example the $M_n$ of the polyester ranges from 1750 to 6200 g/mol, for example the $M_n$ of the polyester ranges from 1900 to 6000 g/mol.

The viscosity of the polyester is measured at 160° C. using as a cone and plate rheometer the Brookfield CAP 2000+ Viscometer with spindle CAP-S-05 at 21 rpm (shear rate 70 $s^{-1}$).

The polyester preferably has a viscosity at 160° C. of at most 200 Pa·s, more preferably the polyester has a viscosity of at most 150 Pa·s even more preferably of at most 125 Pa·s, more preferably of at most 60 Pa·s, even more preferably of at most 58 Pa·s, most preferably of at most 56 Pa·s, for example of at most 55 Pa·s, for example of at most 54 Pa·s, for example of at most 52 Pa·s, for example of at most 50 Pa·s, for example of at most 48 Pa·s. Preferably, the polyester has a viscosity at 160° C. of at least 2 Pa·s, more preferably the polyester has a viscosity of at least 4 Pa·s and most preferably the polyester has a viscosity of at least 5 Pa·s.

Examples of carboxylic acid functional monomers suitable for use in the polyester include for example isophthalic acid, terephthalic acid, 2,6-naphthalene dicarboxylic acid, 4,4'-oxybisbenzoic acid, 3,6-dichloro phthalic acid, tetrachloro phthalic acid, tetrahydro phthalic acid, trimellitic acid, pyromellitic acid, hexahydro terephthalic acid (cyclohexane dicarboxylic acid), hexachloro endomethylene tetrahydro phthalic acid, phthalic acid, azelaic acid, sebacic acid, decane dicarboxylic acid, adipic acid, succinic acid, maleic acid and fumaric acid. These carboxylic acid functional monomers may be used as such, or, in so far as available as their anhydrides, acid chlorides or lower alkyl esters.

Preferably, the polyester comprises isophthalic acid groups, terephthalic acid groups and optionally also adipic acid groups. Preferably the amount of isophthalic acid (IPA) in the polyester is at most 65% w/w, more preferably at most 55% w/w, more preferably at most 50% w/w, even more preferably at most 45% w/w, most preferably at most 40% w/w, for example at most 35% w/w, for example at most 30% w/w, for example at most 29% w/w, for example at most 28% w/w, for example at most 27% w/w, for example at most 26% w/w, for example at most 25% w/w, for example at most 20% w/w, for example at most 15% w/w, for example at most 13.7% w/w based on the polyester. Preferably, the amount of IPA is at least 6% w/w, most preferably at least 7% w/w, for example at least 7.1% w/w based on the polyester.

Alternatively, the amount of IPA in the polyester may be calculated on aromatic acid monomer in the polyester. In that case the amount of isophthalic acid is at most 40% mole on the aromatic acid monomer in the polyester, more preferably is at most 38% mole on the aromatic acid monomer in the polyester, for example the amount of isophthalic acid is at most 24% mole, for example is at most 23% mole on the aromatic acid monomer, for example is at most 22% mole for example is at most 20% mole on the aromatic acid monomer. Examples of aromatic acid monomers include terephthalic acid and isophthalic acid.

Preferably, in case the amount of IPA in the polyester is calculated on the amount of aromatic acid monomer, the amount of isophthalic acid is at least 1% mole on the aromatic acid monomer, more preferably the amount of isophthalic acid is at least 3% mole on the aromatic acid monomer, even more preferably the amount of isophthalic acid is at least 5% mole on the aromatic acid monomer and most preferably the amount of isophthalic acid is at least 7% mole on the aromatic acid monomer.

In a preferred embodiment, the amount of isophthalic acid in the polyester ranges from 7 to 35% w/w based on the polyester. These thermosetting powder coating compositions can provide powder coatings that have at least two of the following three coating properties such as limited to no blooming, sufficient reverse impact resistance and acceptable smoothness with limited to no blooming being one of the two coating properties.

Preferably the amount of terephthalic acid (TPA) in the polyester is at most 63.0% w/w, more preferably is at most 62.3% w/w based on the polyester. Preferably the amount of TPA in the polyester is at least 30% w/w, more preferably at least 35% w/w, even more preferably at least 37% w/w, most preferably at least 50% w/w based on the polyester, for example more preferably is at least 51.7% w/w based on the polyester.

Preferably the molar ratio of TPA used to prepared the polyester to IPA used to prepare the polyester (TPA/IPA) is at least 1.1, more preferably at least 1.2, even more preferably at least 1.23, most preferably at least 1.28, for example at least 1.3, for example at least 1.5, for example at least 1.7, for example at least 2.0, for example at least 2.5, for example at least 3.1, for example at least 3.2, for example at least 3.3, for example at least 3.5.

Preferably, adipic acid is present in the polyester. The presence of adipic acid in the polyester may be advantageous as it affects the $T_g$ of the polyester and may increase the smoothness of a powder coating prepared from a thermosetting powder coating composition comprising the polyester. Furthermore, the mechanical properties of the powder coating, for example the flexibility may be improved. Preferably, the amount of adipic acid in the polyester is at least 1% w/w, more preferably at least 1.5% w/w, even more preferably at least 2% w/w, most preferably at least 2.5% w/w, for example at least 3% w/w, for example at least 5% w/w based on the polyester. Preferably, the amount of adipic acid in the polyester is at most 15% w/w, more preferably at most 10% w/w, even more preferably at most 8% w/w, most preferably at most 7% w/w, for example at most 6% w/w based on the polyester.

In a preferred embodiment, the amount of adipic acid in the polyester ranges from 1 to 10% w/w based on the polyester.

Also difunctional hydroxycarboxylic acid monomers can be used to obtain the polyester. A difunctional hydroxycarboxylic acid monomer is a monomer having both carboxylic acid and alcohol functional groups, which sum of the carboxylic acid and alcohol functional groups per monomer is 2. Examples of difunctional hydroxycarboxylic acid monomers include but are not limited to hydroxy pivalic acid and hydroxystearic acid, and/or lactones such as for example ε-caprolactone.

Also monocarboxylic acids such as for example benzoic acid, tert.-butyl benzoic acid, hexahydrobenzoic acid and/or saturated aliphatic monocarboxylic acids may be used in the preparation of the polyester.

Useful alcohols, reactable with the carboxylic acids to obtain the polyester include aliphatic diols. Suitable examples include ethylene glycol, propane-1,2-diol, propane-1,3-diol, butane-1,2-diol, butane-1,4-diol, butane-1,3-diol, 2,2-dimethylpropanediol-1,3 (=neopentylglycol), hexane-2,5-diol, hexane-1,6-diol (1,6-hexanediol), 2,2-bis-(4hydroxy-cyclohexyl)-propane (hydrogenated bisphenol-A), 1,4-dimethylolcyclohexane, ethyleneglycol, dipropylene glycol, 2,2-bis[4-(2-hydroxy ethoxy)-phenyl]propane, the hydroxy pivalic ester of neopentyl glycol, 2-ethyl, 2-butyl propanediol-1,3 (=butylethylpropane diol), 2-ethyl, 2-methyl propanediol-1,3 (=ethylmethylpropane diol), 2-methyl-1,3-propane diol (=mp-diol).

The thermosetting powder coating compositions of the present invention comprise a polyester and a crosslinker. The polyester is prepared from at least the following monomers: neopentylglycol, a difunctional alcohol other than neopentylglycol; isophthalic acid, terephthalic acid, optionally adipic acid and a branching monomer chosen from the group of an at least trifunctional carboxylic acid, an at least trifunctional alcohol, an at least trifunctional hydroxy carboxylic acid and mixtures thereof. The amount of the difunctional alcohol other than neopentylglycol in the polyester ranges from 1 to 50% w/w based on the polyester. Preferably the amount of the difunctional alcohol other than neopentylglycol in the polyester ranges from 1 to 11% w/w based on the polyester, for example the amount of the difunctional alcohol other than neopentylglycol in the polyester ranges from 1 to 10% w/w based on the polyester, for example the amount of the difunctional alcohol other than neopentylglycol in the polyester ranges from 5 to 8% w/w based on the polyester.

In a preferred embodiment, the amount of isophthalic acid in the polyester ranges from 7 to 35% w/w based on the polyester, the amount of difunctional alcohol other than neopentylglycol in the polyester ranges from 1 to 11% w/w based on the polyester and the polyester has a viscosity of at most 56 Pa·s measured at 160° C. using as a cone and plate rheometer the Brookfield CAP 2000+ Viscometer with spindle CAP-S-05 at 21 rpm (shear rate 70 s$^{-1}$). These thermosetting powder coating compositions provide powder coatings that have at least limited to no blooming and acceptable smoothness.

Preferably when 2-methyl-1,3-propanediol is used as the difunctional alcohol other than neopentylglycol, then preferably the amount of 2-methyl-1,3-propanediol is at least 8% w/w based on the polyester and at most 11% w/w based on the polyester.

Preferably when the difunctional alcohol other than neopentylglycol, is a difunctional alcohol other than neopentylglycol and 2-methyl-1,3-propanediol, then preferably the amount of said difunctional alcohol is at least 1% w/w based on the polyester and at most 10% w/w based on the polyester.

In a preferred embodiment, the invention provides for a thermosetting powder coating composition as described herein,
wherein the amount of adipic acid in the polyester ranges from 1 to 10% w/w based on the polyester and
wherein the amount of isophthalic acid in the polyester ranges from 7 to 30% w/w based on the polyester and
wherein the polyester has a viscosity of at most 56 Pa·s measured at 160° C. using as a cone and plate rheometer the Brookfield CAP 2000+ Viscometer with spindle CAP-S-05 at 21 rpm (shear rate 70 s$^{-1}$) and
wherein the difunctional alcohol other than neopentylglycol ranges from 8 to 11% w/w based on the polyester when the difunctional alcohol other than neopentyl glycol is 2-methyl-1,3-propanediol or
wherein the difunctional alcohol other than neopentylglycol ranges from 1 to 10% w/w based on the polyester when the difunctional alcohol other than neopentyl glycol is a difunctional alcohol other than neopentylglycol and 2-methyl-1,3-propanediol.

These thermosetting powder coating compositions can provide powder coatings that combine the following three coating properties such as limited to no blooming, sufficient reverse impact resistance and acceptable smoothness.

In a preferred embodiment, the invention provides for a thermosetting powder coating composition as described herein,
wherein the difunctional alcohol other than neopentylglycol ranges from 1 to 5% w/w based on the polyester when the difunctional alcohol other than neopentyl glycol is a difunctional alcohol other than neopentylglycol and 2-methyl-1,3-propanediol and
wherein the amount of isophthalic acid in the polyester ranges from 7 to 30% w/w based on the polyester and
wherein the polyester has a viscosity of at most 56 Pa·s measured at 160° C. using as a cone and plate rheometer the Brookfield CAP 2000+ Viscometer with spindle CAP-S-05 at 21 rpm (shear rate 70 s$^{-1}$).

These thermosetting powder coating compositions present an improved storage stability and provide powder coatings that have limited to no blooming, sufficient reverse impact resistance and acceptable smoothness.

In a preferred embodiment of the invention, the polyester with functional groups capable of reacting with β-hydroxyalkylamide groups is a carboxylic acid functional polyester. A carboxylic acid functional polyester may be prepared by selecting the ratio of alcohols and carboxylic acids or anhydrides such that there is an excess of carboxylic acid or anhydride over alcohol (so as) to form a polyester which has terminal carboxylic acid and/or carboxylic acid anhydride groups. Preferably, the carboxylic acid functional polyester has an acid value of at least 15, more preferably of at least 30, even more preferably of at least 32, most preferably of at least 34, for example of at least 35, for example of at least 40, for example of at least 45, for example of at least 48 mg KOH/g of the polyester. Preferably, the carboxylic acid functional polyester has an acid value of at most 120, more preferably at most 80, even more preferably at most 65, most preferably at most 60, for example most preferably at most 58, for example at most 56, for example at most 55, for example at most 54, for example at most 53, for example at most 52 mg KOH/g of the polyester. A thermosetting powder coating composition comprising a carboxylic acid functional polyester with a lower acid value is more cost effective since less amount of compounds having β-hydroxyalkylamide groups (crosslinker), is required. Moreover, the storage stability of a thermosetting powder coating composition comprising a carboxylic acid functional polyester with lower acid value, may be also better.

In another embodiment, the present invention provides for a thermosetting powder coating composition as described herein, wherein the polyester has an acid value that ranges from 30 to 60 mg KOH/g polyester, preferably an acid value that ranges from 34 to 56, even more preferably an acid value that ranges from 45 to 55 mg KOH/g polyester, for example an acid value that ranges from 48 to 54 mg KOH/g polyester.

Preferably, the polyester has a hydroxyl value of at most 14, more preferably of at most 12, even more preferably of at most 10, most preferably of at most 8, for example of at most 7, for example of at most 6, for example of at most 5 mg KOH/g of the polyester. Preferably, the polyester has a hydroxyl value of at least 1 mg KOH/g of the polyester.

In another embodiment, the present invention provides for a thermosetting powder coating composition as described herein, wherein the polyester is a carboxylic acid functional, Preferably the amount of neopentylglycol (NPG) in the polyester ranges from 25-40% w/w, for example from 30.0 to 35.0% w/w based on the polyester.

Preferably the amount of difunctional alcohol other than neopentylglycol in the polyester is at most 45, more preferably at most 35, for example at most 30, for example at most 25, for example at most 20, for example at most 15, for example at most 11, for example at most 10 or for example at most 8% w/w based on the polyester. Preferably the amount of the difunctional alcohol other than neopentylglycol (NPG) in the polyester is at least 1, for example is at least 5.1% w/w based on the polyester.

Examples of difunctional alcohols other than neopentylglycol include but are not Limited to ethyleneglycol, 1,6-hexanediol, butyl-ethyl-propanediol, 1,4-butanediol, 2-methyl-1,3-propanediol and 1,3-propanediol. In the preparation of the polyester, preferably the difunctional alcohol other than neopentylglycol, is ethyleneglycol, neopentylglycol-hydroxypivalic acid ester, 1,6-hexanediol or a mixture thereof. Even more preferably in the preparation of the polyester the difunctional alcohol other than neopentylglycol is 1,6-hexanediol.

Preferably neopentylglycol-hydroxypivalic acid ester (=hydroxypivalic-neopentylglycolester) is used as the difunctional alcohol other than neopentylglycol in the polyester in the thermosetting powder coating composition of the present invention as outdoor durability of a cured powder coating obtained therefrom is increased by the incorporation of neopentylglycol-hydroxypivalic acid ester in the polyester.

An at least trifunctional alcohol is a monomer having at least three alcohol groups. An at least trifunctional alcohol may be used in the preparation of the polyester. Examples of at least trifunctional alcohols include glycerol, hexanetriol, trimethylol ethane, trimethylol propane, pentaerythritol and sorbitol. Preferably, if an at least trifunctional alcohol is used in the preparation of the polyester, trimethylolpropane is used.

An at least trifunctional carboxylic acid is a monomer having at least three functional 'carboxylic acid' groups. A carboxylic acid anhydride group should be counted as two 'carboxylic acid' groups. The sum of carboxylic acid groups should be at least three; for example a monomer having an anhydride group and a carboxylic acid group is, in the context of the present invention, is a trifunctional carboxylic acid. Also, an at least trifunctional carboxylic acid may be used in the preparation of the polyester. Examples of at least trifunctional acids include but are not limited to trimellitic acid, trimellitic acid anhydride and pyromellitic acid. Preferably, if an at least trifunctional carboxylic acid or anhydride is used in the preparation of the polyester, trimellitic acid or trimellitic anhydride is used.

An at least trifunctional hydroxycarboxylic acid is a monomer having both carboxylic acid (anhydride) and alcohol functional groups, which sum of the carboxylic acid (anhydride) and alcohol functional groups per monomer is at least 3. A carboxylic acid anhydride group should be counted as two 'carboxylic acid' groups. For example, an at least trifunctional hydroxycarboxylic acid is a monomer having both carboxylic acid and alcohol functional groups. Examples of an at least trifunctional hydroxycarboxylic acid include for example dimethylolpropionic acid.

Preferably, the polyester having functional groups capable of reacting with β-hydroxyalkylamide is prepared from at least the following monomers: neopentylglycol, a difunctional alcohol other than neopentylglycol; isophthalic acid, terephthalic acid, optionally adipic acid and a branching monomer chosen from the group of an at least trifunctional carboxylic acid, an at least trifunctional alcohol, an at least trifunctional hydroxy carboxylic acid and mixtures thereof, wherein the total amount of these monomers in the polyester is at least 90% w/w, preferably at least 93% w/w, more preferably at least 95% w/w, even more preferably at least 97% w/w, in particular at least 98% w/w, more in particular at least 99% w/w and most preferably 100% w/w based on the polyester.

As is apparent to the skilled person, besides the polyester, also other resins may be present in the thermosetting powder coating composition of the invention. If a mixture of polyesters is present in the thermosetting powder coating composition of the present invention, then preferably each polyester is independently prepared from at least the following monomers: neopentylglycol, a difunctional alcohol other than neopentylglycol; isophthalic acid, terephthalic acid, optionally adipic acid and a branching monomer chosen from the group of an at least trifunctional carboxylic acid, an at least trifunctional alcohol, an at least trifunctional hydroxy carboxylic acid and mixtures thereof, wherein preferably the total amount of these monomers in the polyester is at least 90% w/w, preferably at least 93% w/w, more preferably at least 95% w/w, even more preferably at least 97% w/w, in particular at least 98% w/w, more in particular at least 99% w/w and most preferably 100% w/w based on the polyester.

Preferably, the amount of the polyester is at least 90% w/w, preferably at least 93% w/w, more preferably at least 95% w/w, even more preferably at least 97% w/w, in particular at least 98% w/w, more in particular at least 99% w/w and most preferably 100% w/w based on total amount of resins present in the thermosetting powder coating composition.

It is advantageous to use only the polyester in the thermosetting powder coating composition as the use of only one polyester as opposed to a mixture of resins in a thermosetting powder coating composition is less laborious and economically more attractive.

In a special embodiment, the present invention provides for a thermosetting powder coating composition comprising a crosslinker and a polyester
  wherein the polyester has functional groups which functional groups are capable of reacting with β-hydroxyalkylamide groups,
  wherein the polyester is prepared from at least the following monomers: neopentylglycol, a difunctional alcohol other than neopentylglycol; isophthalic acid, terephthalic acid, adipic acid and a branching monomer chosen from the group of an at least trifunctional carboxylic acid, an at least trifunctional alcohol, an at least trifunctional hydroxy carboxylic acid and mixtures thereof, wherein the difunctional alcohol other than neopentylglycol is 1,6-hexanediol and the amount of the 1,6-hexanediol in the polyester ranges from 1 to 5% w/w based on the polyester, wherein the amount of isophthalic acid in the polyester ranges from 15 to 30% w/w based on the polyester, wherein the amount of adipic acid in the polyester ranges from 3 to 6% w/w based on the polyester, wherein the polyester has a functionality of at least 2.4 and of at most 2.8, wherein the polyester is a carboxylic acid functional with an acid value that ranges from 45 to 60, for example from 45 to 55 mg KOH/g of the polyester, wherein the crosslinker is a compound having β-hydroxyalkylamide groups.

These thermosetting powder coating compositions present an improved storage stability and provide powder coatings that have the following three coating properties: limited to no blooming, sufficient reverse impact resistance and acceptable smoothness.

The crosslinker in the thermosetting powder coating composition of the present invention is a compound having β-hydroxyalkylamide groups, but may also be a mixture of said compounds. Suitable examples of commercially available β-hydroxyalkylamide compounds are for example N,N,N',N'-tetrakis-(2-hydroxyethyl)-adipamide (Primid® XL-552) and N,N,N',N'-tetrakis-(2-hydroxypropyl)-adipamide (Primid® QM 1260).

The ratio between the amount of the polyester and the amount of the crosslinker is generally chosen in the range of from 85:15 to 99:1, preferably in the range of from 90:10 to 98:2, Typically, if the polyester is the only resin present in the thermosetting powder coating composition of the present invention, the ratio between the amount of the polyester and the amount of the crosslinker is chosen in the range of from 92:8 to 97:3, for example 93:7 or 95:5.

According to a preferred embodiment of the present invention, the thermosetting powder coating composition comprises a compound of monomeric or polymeric nature having oxirane rings (epoxy compound in the context of the present invention) in an amount of at most 1% w/w relative to the polyester. Preferably the thermosetting powder coating composition of the present invention does not comprise any epoxy compound.

The glass transition temperature ($T_g$) of the uncured thermosetting powder coating composition is preferably at least 20° C., more preferably at least 25° C., even more preferably at least 35° C., most preferably at least 45° C. The glass transition temperature ($T_g$) of the uncured thermosetting powder coating composition is preferably at most 100° C., more preferably at most 90° C., even more preferably at most 80° C., most preferably at the most 70° C. In case in which the thermosetting powder compositions have a $T_g$ as well as a $T_m$, the $T_m$ is preferably at least 30° C., more preferably at least 40° C., even more preferably at least 45° C., most preferably at least 50° C. The $T_m$ of the uncured thermosetting powder coating composition is preferably at most 160° C., more preferably at most 140° C., even more preferably at most 120° C., most preferably at most 100° C. Glass transition temperature ($T_g$) and/or the $T_m$ of the uncured thermosetting powder coating composition is measured via temperature modulated DSC (MDSC). The measurement of $T_g$ and/or $T_m$ is performed by using a TA Instruments Q 2000 MDSC with a RCS2-90 cooling unit. Measurements are done in $N_2$ atmosphere and the MDSC apparatus is calibrated with indium, zinc and water. The software used for operating the MDSC and analyzing the thermograms is the Q-Series Advantage version 2.8.0394 from TA Instruments. A sample of approximately 10 mg sealed in aluminum DSC pans is heated up from 0° C. up to 200° C. at a heating rate of 5° C./min and an amplitude of temperature modulation of ±0.5° C. with a period of 40 s. The $T_g$ signal seen in the reversible heat flow is determined by using the analysis software.

The thermosetting powder coating composition according to the invention may further comprise pigments, fillers and/or the usual (processing) additives, for example anti-oxidants, degassing agents, smoothness, appearance enhancing agents or (light) stabilizers. The pigments may be inorganic or organic. Suitable inorganic pigments include for example, titanium dioxide, zinc sulphide, iron oxide and/or chromium oxide. Suitable organic pigments include for example azo compounds. Suitable fillers include for example metal oxides, silicates, carbonates and sulphates. Suitable stabilizers include for example primary and/or secondary antioxidants and UV stabilizers for example quinones, (sterically hindered) phenolic compounds, phosphonites, phosphites, thioethers and HALS (hindered amine light stabilizers). Examples of suitable degassing agents include cyclohexane dimethanol bisbenzoate, benzoin and benzoin derivatives such as for example those described in WO02/50194. Other additives, such as additives for improving tribo-chargeability may also be added.

In a preferred embodiment of the invention, the thermosetting powder coating composition comprises a processing additive of general formula $X_n$-$Y_m$, wherein n is an integer from 1 to 3, preferably 1 and m is an integer from 1 to 4, preferably 1 to 3, which processing additive has a $T_g$ in the range of from 30 to 90° C., wherein Y is a polyester, polyacrylate or polyesterurethane and wherein Y is connected via an ester bond to X, which is chosen from the group of phosphoric acid, phosphonic acid, sulphuric acid, sulphonic acid, sulfamine acid, boric acid, pyridine ethanol, 1,4,5,6,7,7-hexachlorobicyclo[2.2.1]-hept-5-ene-2,3-dicarboxylic acid (HET acid), maleic acid and combinations thereof in an amount of at least 0.5% w/w on the polyester. If Y is a polyester, which is preferred, the polyester may be manufactured from at least an alcohol monomer selected from the group consisting of neopentylglycol, ethylene glycol, diethylene glycol, propylene glycol, trimethylolpropane and glycerol and at least a carboxylic acid monomer selected from the group consisting of terephthalic acid, isophthalic acid, orthophthalic acid, adipic acid, succinic acid, trimellitic acid and the anhydrides corresponding to the carboxylic acid monomer. Preferably, the $M_n$ of the processing additive is chosen in the range from 750 to 5,000 g/mol.

A processing additive of general formula $X_n$-$Y_m$ may be prepared by preparing Y, which is a polyester, polyacrylate or polyurethane-polyester according to methods well known in the art and condensating the hydroxyl functional groups of Y with an acid chosen from the group of phosphoric acid, phosphonic acid, sulphuric acid, sulphonic acid, sulfamine acid, boric acid, HET acid, maleic acid and combinations thereof or by condensation of the carboxyl functional groups of Y with an alcohol such as for example pyridine ethanol.

Preferably the amount of processing additive of general formula $X_n$-$Y_m$ is at most 12% w/w on the polyester, more preferably is at most 8% w/w on the polyester, even more preferably is at most 7% w/w on the polyester. Preferably the amount of processing additive of general formula $X_n$-$Y_m$ is at least 0% w/w on the polyester, more preferably is at least 2% w/w on the polyester, even more preferably is at least 3% w/w on the polyester and even most preferably is at least 4% w/w on the polyester.

The processing additive of general formula $X_n$-$Y_m$ may be added to the polyester during the synthesis of the polyester. Also, the processing additive of general formula $X_n$-$Y_m$ may be added to the polyester just before the polyester leaves the reactor in which the polyester was synthesized. In other words, the processing additive of general formula $X_n$-$Y_m$ may be added to the polyester when the polyester is in liquid state e.g. above its glass transition temperature. The mixture of the polyester and the processing additive of general formula $X_n$-$Y_m$ may then be added as one component into the thermosetting powder coating composition. Alternatively, the processing additive of general formula $X_n$-$Y_m$ may be added to the thermosetting powder coating composition as a separate ingredient. Preferably, the processing additive of general formula $X_n$-$Y_m$ is added to the polyester just before the polyester leaves the reactor in which the polyester was synthesized.

In another embodiment, the invention relates to a thermosetting powder coating composition as described herein, wherein the thermosetting powder coating composition further comprises a processing additive of general formula $X_n$-$Y_m$, wherein n is an integer from 1 to 3 and m is an integer from 1 to 4, which processing additive has a $T_g$ in the range of from 30 to 90° C., wherein Y is a polyester, polyacrylate or polyesterurethane and wherein Y is connected via an ester bond to X, which is chosen from the group of phosphoric acid, phosphonic acid, sulphuric acid, sulphonic acid, sulfamine acid, boric acid, pyridine ethanol, 1,4,5,6,7,7-hexachlorobicyclo[2.2.1]-hept-5-ene-2,3-dicarboxylic acid (HET acid), maleic acid and combinations thereof, wherein the processing additive is present in an amount of at least 0.5% w/w on the polyester.

Preferably, the curing of the thermosetting powder coating composition takes place using thermal energy only (for clarity, the term thermal energy does not include UV- or electron beam induced curing).

In yet another embodiment, the invention relates to a powder coating obtainable by curing preferably heat curing of a thermosetting powder coating composition as described herein.

In another aspect, the invention relates to a substrate fully or partially coated with the thermosetting powder coating composition of the invention or with a powder coating according to the invention.

The substrates can be heat-sensitive and/or non-heat sensitive.

In one embodiment of the invention the substrate is a non heat-sensitive substrate, for example glass, ceramic, fibre cement board, or metal, for example aluminum, copper or steel.

In another embodiment of the invention, the substrate may be a heat-sensitive substrate. Heat-sensitive substrates include plastic substrates, wood substrates, for example solid wood, such as for example: hard wood, soft wood, plywood; veneer, particle board, low density fibre board, medium density fibreboard and high density fibreboard, OSB (Oriented Strand Board) wood laminates, chipboard and other substrate in which wood is a important constituent, such as for example foil covered wooden substrates, engineered wood, plastic modified wood, plastic substrates or wood plastic compounds (WPC); substrates with cellulosic fibres, for example cardboard or paper substrates; textile and leather substrates.

Other heat-sensitive substrates include objects that are a combination of a metal substrate with a heat-sensitive part, such as plastic hosing, heavy metal parts, strips, for example aluminium frames with heat strips etc.

Examples of plastic substrates include unsaturated polyester based compositions, ABS (acrylonitrile butadiene styrene), melamine-formaldehyde polyester polyester resins, polycarbonate, polypropylene, ethylene-propylene-diene monomer (EPDM), thermoplastic olefin (TPO), polyurethane (PU), polypropylene oxide (PPO), polyethylene oxide (PEO), polyethyleneterephthalate (PET) and nylon, for example polyamide 6,6 and combinations thereof, for example polycarbonate-ABS.

Other substrates that are particularly suitable for coating with the powder coating of the invention are those where a low temperature cure is desired for efficient production, such as heavy metal parts.

In yet another aspect, the invention also relates to a process for the preparation of the thermosetting powder coating composition of the invention. The preparation of thermosetting powder coating compositions is described by Misev in "Powder Coatings, Chemistry and Technology" (pp. 224-300; 1991, John Wiley) hereby incorporated by reference.

A common way to prepare a thermosetting powder coating composition is to mix the separately weight-out components in a premixer, heat the obtained premix, for example in a kneader, preferably in an extruder to obtain an extrudate, cool down the obtained extrudate until it solidifies and crush it into granules or flakes that are further grinded to reduce the particle size followed by appropriate classification to obtain a thermosetting powder coating composition of the right particle size. Therefore, the invention also relates to a process for the preparation of a thermosetting powder coating composition according to the invention comprising the steps of:

a. mixing the components of the thermosetting powder coating composition to obtain a premix b. heating the obtained premix, preferably in an extruder, to obtain an extrudate c. cooling down the obtained extrudate to obtain a solidified extrudate and d. breaking the obtained solidified extrudate into smaller particles to obtain the thermosetting powder coating composition and preferably e. classifying the thus prepared powder particles via a sieve and collect sieve fraction with particle size below 90 μm.

Preferably, the premix is heated to a temperature in the range of 80-130° C., more preferably in the range of 100-130° C., even more preferably in the range of 110-120° C., even most preferably in the range of 115-125° C. If the premix is heated in an extruder, it is preferred to use a temperature control in order to avoid too high temperatures that could lead to cure of the thermosetting powder coating composition in the extruder.

The thermosetting powder coating compositions of the invention may be also used in a way that two individual thermosetting powder coating compositions of the invention prepared separately according to the aforementioned way may act as the precursors for the preparation of thermosetting powder coating compositions derived upon dry-blending of the two or more individual thermosetting powder coating compositions. The thermosetting powder coating composition thus derived will be applied onto a substrate according to relevant embodiments of the invention and can be cured according to the disclosures of the invention.

In another aspect, the invention relates to a substrate fully or partially coated with a thermosetting powder coating composition as described herein or with a powder coating as described herein.

In yet another aspect, the invention relates to a process for coating a substrate comprising the following steps:
applying the thermosetting powder coating composition according to any one of claims 1-11 to a substrate such that the substrate is partially or fully coated with the thermosetting powder coating composition.
heating the obtained partially or fully coated substrate for such time, preferably from 1 minute to 40 minutes, and to such temperature, preferably from 140° C. to 180° C., that a coating is obtained that is at least partially cured.

The thermosetting powder coating composition of the present invention may be applied using the techniques known to the person skilled in the art, for example using electrostatic spray or electrostatic fluidized bed.

Heating of the coated substrate may be done using conventional methods, such as with a convection oven and/or with an IR lamp.

The time during which the coating is at least partially cured is preferably below 60 minutes and usually above 1 minute in case a convection oven is used to heat the coating. More preferably, the cure time is below 40 minutes in case a convection oven is used to heat the coating.

The thermosetting powder coating composition is especially suitable for curing at temperatures below 225° C. Therefore, the temperature at which the thermosetting powder coating composition is cured is below 225° C. and usually above 140° C. Preferably, the cure temperature is lower than 190° C., more preferably lower than 170° C., most preferably lower than 160° C. Preferably, the cure temperature is at least 140° C., more preferably 145° C., even more preferably at least 150° C.

In another one embodiment of the invention, the invention relates to a process for coating a substrate comprising the following steps:
applying a thermosetting powder coating composition according to the invention to a substrate such that the substrate is partially or fully coated with a coating.
heating the obtained partially or fully coated substrate for 30 seconds up to 60 minutes, preferably from 1 minute up to 40 minutes, more preferably from 5 minutes to 30 minutes and to a temperature from 140° C. to 225° C., preferably from 140 to 180° C. such that a coating is obtained that is at least partially cured.

In yet another aspect, the invention relates to a substrate that is fully or partially coated with a thermosetting powder coating composition according to the present invention and the thermosetting powder coating composition is cured at a temperature preferably below 225° C. and usually above 140° C. Preferably, the cure temperature is lower than 190° C., more preferably lower than 170° C., most preferably lower than 160° C. Preferably, the cure temperature is at least 140° C., more preferably 145° C., even more preferably at least 150° C.

In another aspect, the invention also relates to the use of the thermosetting powder coating composition for the preparation of a powder coating suitable for both outdoor powder coating applications e.g. building facades and structures, industrial and agricultural equipment and indoor powder coating applications e.g. furniture, tools, white goods, etc.

In yet another embodiment, the invention relates to the use of the partially or fully coated substrate according to claim 13, wherein the fully or partially coated substrate is cured at a temperature ranging from 140 to 180° C. for a time ranging from 1 minute to 40 minutes, for automotive applications (car parts, composite structures, ceramic structures, etc.), marine applications (ships, boats), aerospace applications (planes, helicopters, composite structures, ceramic structures, etc.), medical applications (artificial joints, meshes, woven or non-woven sheets, tapes, ribbons, bands, cables, tube-like products for e.g. ligament replacement, composite structures, ceramic structures, etc.), defence applications (ballistic protection, body armor, ballistic vests, ballistic helmets, ballistic vehicle protection, composite structures, ceramic structures, etc.), sports/recreational applications (fencing, skates, skateboarding, snowboarding, suspension lines on sport parachutes, paragliders, kites, kite lines for kite sports, climbing equipment, composite structures, ceramic structures, etc.), architectural applications (windows, doors, (pseudo-)walls, cables, etc.), bottling applications, household applications (household appliances, whitegoods, furniture, etc.), machinery applications (can and bottle handling machine parts, moving parts on weaving machines, bearings, gears, composite structures, ceramic structures, etc.).

The thermosetting powder coating compositions are not only very suitable for low bake, but may also be used for fast cure. It is known that thermosetting powder coating compositions that can be cured at lower temperatures offer at the same time the possibility for cure at relatively higher temperatures but for significant shorter times, thus allowing the end-user (powder coaters) to select the optimum cure conditions at will, hence maximizing the process efficiency and the powder coating line's throughput.

The invention will now be illustrated by way of the following examples without however being limited thereto.

EXAMPLES

In the Examples section, the abbreviation "Comp" denotes a Comparative Example of either a polyester e.g. CompPR1, or a thermosetting powder coating composition e.g. CompPCC1, or a powder coating e.g. CompPC1.

The storage stability is a property of a thermosetting powder coating composition.

Analytical Methods and Techniques for the Measurement of the Properties of the Polyesters The measurement of the glass transition temperature ($T_g$) of the polyesters was carried out via differential scanning calorimetry (DSC) on a Mettler Toledo, TA DSC821, in $N_2$ atmosphere, calibrated with indium, zinc and water. The processing of the signal (DSC thermogramme, Heat Flow vs. Temperature) was carried out via STARe Software version 9.10 provided by Mettler Toledo A.G. A sample of 10 mg was heated from room temperature up to 150° C. at a heating rate of 40° C./min. As soon as the sample reached 150° C., temperature remained constant for 15 min. Subsequently, the sample was cooled down to 0° C. at a cooling rate of 40° C./min. After the sample reached 0° C. and keeping the sample in that temperature for 30 seconds, it was subsequently heated up to 200° C. at a heating rate of 5° C./min. At the glass transition temperature, the mobility of the polyester molecules changes, resulting in a different heat capacity and this results in a baseline change/shift in the DSC thermograph. This so called step transition leads to a curved line between the two baselines. In certain cases and depending on the polyester this change/shift is not very sharp, though extends over a temperature range which generally depends on the heating rate used in a DSC measurement. This curve or step is used to calculate the $T_g$ of the polyester, by drawing tangents applied to the step intersecting with both these tangents at the extrapolated onset temperature and the extrapolated end temperature, respectively. The midpoint which according to the present invention is defined as the $T_g$ of the polyester, is determined by taking the temperature at the half step height between the intersects of the inflection tangent.

Tangents above and below $T_g$ are adapted in such a way that optimum fit is achieved with the baselines. The accuracy of the method is +/−0.5° C. In case the polyester presents also a melting temperature ($T_m$) this will be recorded as an endothermic peak and $T_m$ is the temperature corresponding to the minimum of heat flow of the endothermic peak.

Viscosity measurements were carried out at 160° C., using as a cone and plate rheometer the Brookfield CAP 2000+ Viscometer, with spindle CAP-S-05 at 21 rpm (shear rate 70 $s^{-1}$).

The acid value (AV) (mg KOH/g of polyester) and hydroxyl value (OHV) (mg KOH/g of polyester) of the polyesters were measured titrimetrically according to ISO 2114-2000 and ISO 4629-1978, respectively.

The $T_g$, the viscosity, the AV and OHV were measured on the polyester without the addition of any additives.

The functionality (f) for a polyester of a certain $M_n$ (theoretical value) and a measured acid value (AV), was calculated according to the following equation:

$$f=(M_n \times AV)/56110$$

The $M_n$ (theoretical value) was calculated by multiplying the targeted functionality (f) with 56110 and dividing the outcome thereof by the measured acid value (AV) (mg KOH/g of the polyester) according to the following equation:

$$M_n=(56110 \times f)/AV$$

The theoretical values of the $M_n$ and f refer to the polyester without the addition of any additives.

Measurements and Assessment of Properties of the Thermosetting Powder Coating Compositions The storage stability of the thermosetting powder coating compositions of the present invention was tested according to ISO 8130/part 8, at 40° C. for a total of 28 days. Prior to assessing the storage stability the thermosetting powder coating composition was left to cool down to room temperature for at least 2 hours. The extent of the agglomeration was visually assessed and ranked according to the following rating on a 1-10 scale [1: very poor stability (extensive agglomeration, thermosetting powder coating composition was compacted into one solid block) and 10: excellent stability (no agglomeration, free flowing powder, powder flow same as a freshly prepared thermosetting powder coating composition)].

Measurements and Assessment of Properties of the Powder Coatings

The properties of the powder coatings were assessed using two types of panels, depending on the type of the test. When curing took place in a gradient oven (BYK-Gardner GmbH Gradient Oven, oven's and panel's temperature ranged from 100° C. to 200° C. in a linear temperature gradient over the complete length of the oven and that of the panel), untreated aluminum (AlMg3) panels with a thickness of 1 mm, were used. When curing took place in an air-circulation oven (Heraeus Instruments UT6120), 0.8 mm thick chromate aluminium Q-panels (type: ALQ-46) were used. The assessment of the powder coating properties was carried out on a powder coating that was cured at such time and temperature as stated herein under atmospheric pressure (1 bar).

Coating thickness was measured by a PosiTector 6000 coating thickness gage from DeFelsko Corporation. The RIR of the powder coatings was measured at a film thickness of 75 micrometer. All other properties of the powder coatings were measured at a film thickness of 60 micrometer.

Reverse impact resistance (RIR) was tested according to ASTM D 2794, with a ⅝" ball and at a film thickness of 75 µm on ALQ-46 panels 1 day after the curing took place. A 'Pass' in the row for RIR of 60 inch/lbs at 155° C./15 min indicates that the coating could withstand the impact when the corresponding thermosetting powder coating composition was cured for 15 minutes at 155° C. A 'fail' indicates that the coating did not withstand the impact when the corresponding thermosetting powder coating composition was cured for 15 minutes at 155° C.

Full cure of a thermosetting powder coating composition (or 'thermosetting fully cured powder coating composition') is defined herein as the curing temperature and time condition at which the resulted powder coating having coating thickness of 75 µm, showed no cracks or delamination after having been subjected to reverse impact resistance was tested according to ASTM D 2794 as described above.

Gloss and haze of the powder coatings derived upon full cure of the corresponding thermosetting powder coating compositions on ALQ-46 panels were measured according to ASTM D523 with a BYK-Gardner GmbH Haze-Gloss meter. The gloss is reported at angles of 20° and 60° in gloss units together with the measured haze.

The blooming was assessed qualitatively via the naked eye. An AlMg3 type of panel was coated with a white thermosetting powder coating composition of the invention and the coating derived upon curing of the powder coating in a gradient oven, set from 100 to 200° C. for 30 min, was visually inspected. The blooming can be seen as a surface haze over the coating and the temperature range where blooming occurs is reported. The extent of blooming was assessed as: a) no blooming, b) limited blooming and c) extensive blooming. For the thermosetting powder coating compositions of the invention, their corresponding powder coatings presenting limited to no blooming at curing temperatures higher than 145° C., preferably higher than 140° C. are preferred.

Smoothness of powder coatings derived upon full cure of the corresponding thermosetting powder coating compositions on ALQ-46 panels, was determined by comparing the smoothness of the coating with PCI Powder Coating Smoothness panels (ACT Test Panels Inc., APR22163 (A) Batch: 50708816) at a thickness of approximately 60 µm. The rating of smoothness is from 1 to 10, with 1 representing the roughest coating and 10 representing the smoothest coating. For the thermosetting powder coating compositions of the invention, their corresponding powder coatings presenting smoothness equal or higher to 4, are desirable.

To simulate outdoor durability of the powder coatings, QUV-B tests were done on fully cured thermosetting powder coating compositions on Q-panels according to ASTM G53-88 (UV-B lamps at 313 nm): one cycle is 4 hours UV-B at 50° C. followed by 4 hours condensation at 40° C. with demineralized water. Prior to the initiation of the test, the gloss of the coating is measured at 60° and the time it takes to reduce the gloss level to 50% is reported in hours (see Table 2B, QUV-B). The higher the amount of hours, the better the outdoor durability. For the thermosetting powder coating compositions of the invention, their corresponding powder coatings that presented more than 300 h (QUV-B), are most preferred.

The overbake test and the $NO_x$ test measure the discoloration (yellowing) of a powder coating and also provide an indication of the heat stability of the powder coating. The higher the discoloration (yellowing), the lower the heat stability of the powder coating is. Both tests were used in order to assess the yellowing resistance of the powder coatings of the Examples 69-102.

Overbake test: A white cured panel (ALQ-46, 15 min/155° C. electrical oven) was cut in half, parallel to the long side. Each half had the same powder coating thickness of approximately 60 micrometer. One half was used as reference (nonheat-treated) for the subsequently heat treated sample whilst the other half was introduced into an air circulated oven at a specific temperature for a specific time (test cycle). Each powder coating was tested at two different test cycles: a) 1 hour at 220° C. and b) 10 minutes at 240° C. Upon the completion of the test cycle, the colour (yellowing) of each of the two halves that of the reference and that of the heat treated one, was measured by recording the CIE-lab L*, a* and b* values with the help of a colorimeter (Sheen Spectromatch Gloss Sphere) and according to ISO 7724. The colorimeter used calculated automatically the differences between the reference and the heat-treated sample. The differences between values were recorded according to:

$$\Delta L^* = L^*_{heat\text{-}treated\ sample} - L^*_{reference\ sample}$$

$$\Delta a^* = a^*_{heat\text{-}treated\ sample} - a^*_{reference\ sample}$$

$$\Delta b^* = b^*_{heat\text{-}treated\ sample} - b^*_{reference\ sample}$$

$$\Delta E^* = \sqrt{[(\Delta L^*)^2 + (\Delta a^*)^2 + (\Delta b^*)^2]}$$

$NO_x$ test: A white coated panel (ALQ-36, 2 min/160° C. to melt the composition electrical oven) was cut in half, parallel to the long side. Each half had the same powder coating thickness of approximately 60 micrometer. One half was used as reference (heat-treated in a circulated air atmosphere in an electrical oven) whilst the other half was heat-treated in a electrical oven wherein $NO_2$ gas was flowing through ($NO_2$ flow rate was approximately 3.68 L/hour). During heating, the $NO_2$ forms a mixture of nitric oxides ($NO_x$). Each powder coating of the Examples 69-102 was tested at one test cycle: 20 minutes at 185° C. The test cycle applied was the same for both the reference sample and the one heat treated with $NO_x$. Upon the completion of the test cycle, the colour (yellowing) of each of the two halves that of the reference and that of the $NO_x$ treated one, was measured by recording the CIE-lab L*, a* and b* values with the help of a colorimeter (Sheen Spectromatch Gloss Sphere) and according to ISO 7724. The colorimeter used calculated automatically the colour differences between the reference and the heat-treated sample. The calculations were based on the following equations:

$$\Delta L^* = L^*_{NOx\text{-}treated\ sample} - L^*_{reference\ sample}$$

$$\Delta a^* = a^*_{NOx\text{-}treated\ sample} - a^*_{reference\ sample}$$

$$\Delta b^* = b^*_{NOx\text{-}treated\ sample} - b^*_{reference\ sample}$$

$$\Delta E^* = \sqrt{[(\Delta L^*)^2 + (\Delta a^*)^2 + (\Delta b^*)^2]}$$

The lower the Δb* and ΔE* are, the better the yellowing resistance of a powder coating is.

The resistance to humidity of the powder coatings of the present invention was assessed via the blanching test described on p. 26, §2.3.8.4 and on p. 29, Enclosure 2, in the GSB AL 631 norm (edition January 2006, preliminary version) entitled "International Quality Guidelines for the coating of Aluminium Building Components" which is included herein by reference—with the changes mentioned herein after—and it is issued by GSB International (http://www.gsb-international.de). For the blanching test of the powder coatings of the present invention, AL-36 aluminium panels coated with cured (15 minutes at 160° C.) brown pigmented thermosetting powder coating compositions. In addition, the blanching test was executed by adopting the following in respect to what is described on p. 26, §2.3.8.4 and on p. 29, Enclosure 2 of the GSB AL 631 norm:
   a) the "Schleicher and Schull" round filters used were No 1575 (∅55 mm);
   b) the saturation was done by applying 2 mL±0.1 mL of demineralized water;
   c) the oven temperature was 60° C.±1° C. and this is recorded herein,
   d) the watch glass and the filters were removed upon the taking out the samples from the oven;
   e) upon aforementioned step d), the samples were conditioned for 1 h at room temperature (23° C.);
   f) only the CIE-lab L*, a* and b* values were measured;
   g) only the ΔL* and ΔE* values are reported.

The calculations of ΔL* and ΔE* were based on the following equations [the terms exposed and unexposed sample refer to the same powder coating, part of it was subjected to the blanching test whereas the other part was not (reference sample)].

$$\Delta L^* = L^*_{exposed\ sample} - L^*_{unexposed\ sample}$$

$$\Delta a^* = a^*_{exposed\ sample} - a^*_{unexposed\ sample}$$

$$\Delta b^* = b^*_{exposed\ sample} - b^*_{unexposed\ sample}$$

$$\Delta E^* = \sqrt{[(\Delta L^*)^2 + (\Delta a^*)^2 + (\Delta b^*)^2]}$$

The lower the ΔL* and the ΔE*, the better the resistance to humidity of a powder coating is.

The degassing limit of a thermosetting powder coating composition of the present invention was measured according to ASTM D 714. The degassing limit of a thermosetting powder coating composition is measured on the powder coating prepared therefrom and is expressed in coating thickness (μm). More particularly and in the context of the present invention, it was measured according to the following experimental procedure: an ALQ-46 panel was electrostatically coated with a thermosetting powder coating composition in such a manner that upon curing at 155° C. for 15 minutes, a gradient of thickness typically ranging from 40 to 160 μm was obtained. The resulting powder coating was visually inspected for coating defects. The degassing limit is reported as the layer thickness (μm) from which blisters, pinholes or other coating surface defects start to be visible to the naked eye. Higher values for the degassing limit are preferred to lower values.

Examples 1-34

Synthesis of the polyesters CompPR1, CompPR2, CompPR3 and PR4-PR34 (Examples 1-34): Monomers Used and General Procedure The monomers and other components used for the preparation of polyesters CompPR1, CompPR2, CompPR3 and PR4-PR34 are described in Tables 1, 2 and 3.

A reactor vessel fitted with a thermometer, a stirrer and a distillation device was filled with a tin-based catalyst and all glycols as shown in Tables 1, 2 and 3. The vessel was heated up to 150° C. until the mixture was molten. Then terephtalic acid was added and under a nitrogen flow the temperature was gradually increased to 260° C. while distilling of the reaction water until the acid number of the precursor of the polyester was below 20 mg KOH/g. The reaction mixture was cooled to 220° C. and subsequently the adipic acid and isophtalic acid for the second stage were added. The temperature was raised to 240-250° C. while distilling of water. In the final stage reduced pressure was applied until the polyester reached the desired acid number. Vacuum was stopped and the polyester was cooled down to 195° C. A phenolic anti-oxidant (0.3% w/w based on the total weight of the polyester and the additives) and an amine containing tribo-charging agent (0.1% w/w based on the total weight of the polyester and the additives) were added to the polyester. In case the polyesters contained processing additive (see Tables 1, 2 and 3), this processing additive was added to the polyester when the polyester reached 195° C. Subsequently, the polyester was stirred for at least 20 minutes at 195° C. before discharging it onto an aluminum foil kept at room temperature.

The polyesters of Examples 1-34 are all carboxylic acid functional polyesters and all of them have a hydroxyl value (OHV) lower than 5 mg KOH/g polyester.

TABLE 1

Composition and properties of the polyesters CompPR1, CompPR2, CompPR3 and PR4-PR14.

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| | | | | | | | POLYESTER | | | | | | | |
| | Comp PR1 | Comp PR2 | Comp PR3 | PR4 | PR5 | PR6 | PR7 | PR8 | PR9 | PR10 | PR11 | PR12 | PR13 | PR14 |
| Monomers | | | | | | | | | | | | | | |
| Neopentyl-glycol (g) | 37.7 | 38.0 | 30.1 | 31.6 | 30.0 | 30.2 | 29.5 | 31.5 | 29.0 | 34.3 | 30.8 | 26.7 | 32.5 | 34.3 |
| Trimethylol-propane (g) | 3.3 | 3.4 | 1.9 | 2.6 | 1.8 | 1.8 | 1.8 | 1.3 | 3.4 | 3.0 | 3.2 | 1.8 | 1.8 | 3.0 |
| Ethylene-glycol (g) | —* | — | 7.5 | 5.2 | 7.5 | 7.5 | — | 7.5 | 7.5 | — | — | 10.1 | — | — |
| 2-methyl-1,3-propanediol (g) | — | — | — | — | — | — | 10.1 | — | — | — | — | — | 7.5 | — |
| 1,6-hexanediol (g) | — | — | — | — | — | — | — | — | — | — | 4.0 | — | — | 4.0 |
| Neopentyl-glycol-hydroxy-pivalic acid ester (g) | — | — | — | — | — | — | — | — | — | — | 10.1 | — | — | — |
| Terephtalic acid (g) | 53.2 | 53.3 | 65.3 | 62.8 | 69.0 | 65.7 | 62.8 | 61.8 | 62.1 | 54.5 | 50.3 | 63.5 | 59.3 | 38.7 |
| Isophtalic acid (g) | 15.1 | 12.4 | 4.0 | 6.4 | 7.0 | 7.0 | 7.1 | 7.0 | 7.0 | 15.3 | 13.2 | 7.2 | 7.1 | 31.1 |
| Adipic acid (g) | 4.8 | 7.2 | 6.5 | 6.2 | — | 3.2 | 3.4 | 6.4 | 6.4 | 3.0 | 5.8 | 6.3 | 6.5 | 3.0 |
| Processing Additive $X_n$-$Y_m$ (g) | — | — | — | — | 4.2 | 4.2 | 4.2 | 4.2 | 4.2 | 4.2 | — | 4.2 | 4.2 | 4.2 |
| Properties of the Polyester | | | | | | | | | | | | | | |
| $M_n$ (theoretical value) (g/mol) | 2953 | 3060 | 4265 | 2851 | 4212 | 4137 | 4053 | 5588 | 4990 | 3117 | 2883 | 3984 | 4089 | 2929 |
| Functionality (theoretical value) | 2.7 | 2.7 | 2.6 | 2.5 | 2.5 | 2.5 | 2.5 | 2.5 | 2.9 | 2.6 | 2.6 | 2.5 | 2.5 | 2.6 |
| $T_g$ (° C.) | 58 | 52 | 53 | 54 | 69 | 61 | 56 | 54 | 53 | 56 | 49 | 53 | 49 | 54 |
| Viscosity (Pa · s) @ 160° C. | 43 | 41 | 46 | 24 | 111 | 74 | 59 | 98 | 85 | 57 | 25 | 36 | 30 | 28 |
| AV (mg KOH/g of polyester) | 51 | 50 | 34 | 49 | 33 | 34 | 35 | 25 | 33 | 47 | 51 | 35 | 34 | 50 |

*does not contain specific monomer

TABLE 2

Composition and properties of the polyesters PR15-PR27.

| | 15 | 16 | 17 | 18 | 19 | 20 | 21 | 22 | 23 | 24 | 25 | 26 | 27 |
|---|---|---|---|---|---|---|---|---|---|---|---|---|---|
| | | | | | | | POLYESTER | | | | | | |
| | PR15 | PR16 | PR17 | PR18 | PR19 | PR20 | PR21 | PR22 | PR23 | PR24 | PR25 | PR26 | PR27 |
| Monomers | | | | | | | | | | | | | |
| Neopentyl-glycol (g) | 34.5 | 34.5 | 31.6 | 30.3 | 30.3 | 30.4 | 29.6 | 26.8 | 31.0 | 30.6 | 30.0 | 32.5 | 29.7 |
| Trimethylol-propane (g) | 3.1 | 3.1 | 2.6 | 1.8 | 1.8 | 1.8 | 1.8 | 3.3 | 1.2 | 1.5 | 2.1 | 3.0 | 3.0 |
| Ethylene-glycol (g) | —* | — | 5.2 | 7.5 | 7.5 | 7.5 | — | 7.5 | 7.5 | 7.5 | 7.5 | — | — |

TABLE 2-continued

Composition and properties of the polyesters PR15-PR27.

| | 15 | 16 | 17 | 18 | 19 | 20 | 21 | 22 | 23 | 24 | 25 | 26 | 27 |
|---|---|---|---|---|---|---|---|---|---|---|---|---|---|
| | | | | | | | POLYESTER | | | | | | |
| | PR15 | PR16 | PR17 | PR18 | PR19 | PR20 | PR21 | PR22 | PR23 | PR24 | PR25 | PR26 | PR27 |
| 2-methyl-1,3-propanediol (g) | — | — | — | — | — | — | 10.2 | — | — | — | — | — | — |
| 1,6-hexanediol (g) | — | — | — | — | — | — | — | — | — | — | — | 6.0 | 9.0 |
| Neopentyl-glycol-hydroxy-pivalic acid ester (g) | 5.1 | 5.1 | — | — | — | — | — | — | — | — | — | — | — |
| Terephtalic acid (g) | 51.7 | 51.7 | 55.5 | 62.3 | 60.3 | 59.1 | 59.5 | 63.7 | 62.3 | 62.3 | 62.4 | 43.6 | 43.4 |
| Isophtalic acid (g) | 13.6 | 13.6 | 13.7 | 7.1 | 9.1 | 7.1 | 7.2 | 7.1 | 7.0 | 7.0 | 7.0 | 25.0 | 25.0 |
| Adipic acid (g) | 6.0 | 6.0 | 6.2 | 6.4 | 6.4 | 9.4 | 6.5 | 6.4 | 6.4 | 6.4 | 6.4 | 4.0 | 4.0 |
| Processing Additive $X_n - Y_m$ (g) | — | 4.2 | — | 4.2 | 4.2 | 4.2 | 4.2 | 4.2 | 4.2 | 4.2 | 4.2 | 4.2 | 4.2 |
| Properties of the Polyester | | | | | | | | | | | | | |
| $M_n$ (theoretical value) (g/mol) | 2953 | 3001 | 2750 | 4030 | 4007 | 4113 | 4077 | 2244 | 3784 | 3814 | 4240 | 2894 | 2965 |
| Functionality (theoretical value) | 2.6 | 2.6 | 2.5 | 2.5 | 2.5 | 2.5 | 2.5 | 2.5 | 2.3 | 2.4 | 2.6 | 2.6 | 2.6 |
| $T_g$ (° C.) | 52 | 52 | 52 | 53 | 53 | 47 | 48 | 54 | 53 | 53 | 54 | 49 | 46 |
| Viscosity (Pa · s) @ 160° C. | 28 | 30 | 17 | 35 | 30 | 30 | 34 | 21 | 32 | 36 | 51 | 21 | 21 |
| AV (mg KOH/g of polyester) | 49 | 49 | 51 | 35 | 35 | 34 | 34 | 63 | 34 | 35 | 34 | 50 | 49 |

*does not contain specific monomer

TABLE 3

Composition and properties of the polyesters PR28-PR34.

| | 28 | 29 | 30 | 31 | 32 | 33 | 34 |
|---|---|---|---|---|---|---|---|
| | | | | POLYESTER | | | |
| | PR28 | PR29 | PR30 | PR31 | PR32 | PR33 | PR34 |
| Monomers | | | | | | | |
| Neopentylglycol (g) | 36.3 | 36.3 | 34.3 | 34.3 | 35.3 | 35.3 | 34.4 |
| Trimethylolpropane (g) | 3.0 | 3.0 | 3.0 | 3.0 | 3.0 | 3.0 | 3.0 |
| Ethyleneglycol (g) | —* | — | — | — | — | — | — |
| 2-methyl-1,3-propanediol (g) | — | — | — | — | — | — | — |
| 1,6-hexanediol (g) | 2.0 | 2.0 | 4.0 | 4.0 | 3.0 | 3.0 | 4.0 |
| Neopentylglycol-hydroxypivalic acid ester (g) | — | — | — | — | — | — | — |
| Terephtalic acid (g) | 43.8 | 43.8 | 49.6 | 44.6 | 44.6 | 43.7 | 43.7 |
| Isophtalic acid (g) | 25.1 | 25.1 | 20.2 | 25.2 | 25.2 | 25.0 | 25.0 |
| Adipic acid (g) | 4.0 | 4.0 | 3.0 | 3.0 | 3.0 | 4.0 | 4.0 |
| Processing Additive $X_n - Y_m$ (g) | 4.2 | — | 4.2 | 4.2 | 4.2 | 4.2 | 4.2 |
| Properties of the Polyester | | | | | | | |
| Mn (theoretical value) (g/mol) | 2983 | 2816 | 3051 | 2959 | 2983 | 3007 | 2917 |
| Functionality (theoretical value) | 2.6 | 2.6 | 2.6 | 2.6 | 2.6 | 2.6 | 2.6 |
| $T_g$ (° C.) | 55 | 55 | 55 | 55 | 56 | 54 | 53 |
| Viscosity (Pa · s) @ 160° C. | 36 | 26 | 40 | 35 | 39 | 39 | 27 |
| AV (mg KOH/g of polyester) | 49 | 52 | 48 | 49 | 49 | 49 | 50 |

*does not contain specific monomer

Examples 35-68

Preparation of Thermosetting Powder Coating Compositions CompPCC1, CompPCC2, CompPCC3, PCC4-PCC34 (Examples 35-68) Based on Polyesters CompPR1, CompPR2, CompPR3 and PR4-PR34 (Examples 1-34): Chemicals Used and General Procedure The chemicals used to prepare the thermosetting powder coating compositions CompPCC1, CompPCC2, CompPCC3, PCC4-PCC34 in the following examples are described in Tables 4, 5 and 6. Primid® XL-552 ($T_m$=120-124° C., hydroxyl value 620-700 mg KOH/g of the Primid® XL-552) is a crosslinker from EMS Chemie, Kronos®, 2160 is titanium dioxide from Kronos Titan GmbH, Resiflow® PV 5 is a flow control agent from Worlée-Chemie GmbH.

The thermosetting powder coating compositions were prepared by mixing the components presented in Tables 4, 5 and 6, in a blender and subsequently extruding in a PRISM TSE16 PC twin screw at 120° C. with a screw speed of 200 rpm. The extrudate was allowed to cool to room temperature and broken into chips. The chips were milled in a Retsch ZM100 with a 0.5 mm ring sieve at 18000 rpm and then sieved. The sieve fraction with particle size below 90 μm was collected.

TABLE 4

Composition of thermosetting powder coating compositions CompPCC1, CompPCC2, CompPCC3, PCC4-PCC14.

| | 35 | 36 | 37 | 38 | 39 | 40 | 41 | 42 | 43 | 44 | 45 | 46 | 47 | 48 |
|---|---|---|---|---|---|---|---|---|---|---|---|---|---|---|
| | \multicolumn{14}{c}{THERMOSETTING POWDER COATING COMPOSITION} | | | | | | | | | | | | | |
| | Comp PCC1 | Comp PCC2 | Comp PCC3 | PCC4 | PCC5 | PCC6 | PCC7 | PCC8 | PCC9 | PCC10 | PCC11 | PCC12 | PCC13 | PCC14 |
| Polyester & weight (g) | Comp PR1 (558) | Comp PR2 (558) | Comp PR3 (570) | PR4 (558) | PR5 (570) | PR6 (570) | PR7 (570) | PR8 (576) | PR9 (570) | PR10 (558) | PR11 (558) | PR12 (570) | PR13 (570) | PR14 (558) |
| Crosslinker (PRIMID® XL-552) | 42 | 42 | 30 | 42 | 30 | 30 | 30 | 24 | 30 | 42 | 42 | 30 | 30 | 42 |
| Ratio of amount Polyester:amount Crosslinker | 93:7 | 93:7 | 95:5 | 93:7 | 95:5 | 95:5 | 95:5 | 96:4 | 95:5 | 93:7 | 93:7 | 95:5 | 95:5 | 93:7 |
| Kronos® 2160 (g) | 300 | 300 | 300 | 300 | 300 | 300 | 300 | 300 | 300 | 300 | 300 | 300 | 300 | 300 |
| Resiflow® PV 5 (g) | 9 | 9 | 9 | 9 | 9 | 9 | 9 | 9 | 9 | 9 | 9 | 9 | 9 | 9 |
| Benzoin (g) | 3 | 3 | 3 | 3 | 3 | 3 | 3 | 3 | 3 | 3 | 3 | 3 | 3 | 3 |
| Properties of the Thermosetting Powder Coating Composition | | | | | | | | | | | | | | |
| Storage stability after 28 days at 40° C. (1-10, 10 best) | 9 | n.m. | n.m. | n.m. | n.m. | n.m. | n.m. | n.m. | n.m. | 9 | n.m. | n.m. | 1 | 8 |

TABLE 5

Composition of thermosetting powder coating compositions PCC15-PCC27.

| | 49 | 50 | 51 | 52 | 53 | 54 | 55 | 56 | 57 | 58 | 59 | 60 | 61 |
|---|---|---|---|---|---|---|---|---|---|---|---|---|---|
| | \multicolumn{13}{c}{THERMOSETTING POWDER COATING COMPOSITION} | | | | | | | | | | | | |
| | PCC15 | PCC16 | PCC17 | PCC18 | PCC19 | PCC20 | PCC21 | PCC22 | PCC23 | PCC24 | PCC25 | PCC26 | PCC27 |
| Polyester & weight (g) | PR15 (558) | PR16 (558) | PR17 (558) | PR18 (570) | PR19 (570) | PR20 (570) | PR21 (570) | PR22 (546) | PR23 (570) | PR24 (570) | PR25 (570) | PR26 (558) | PR27 (558) |
| Crosslinker (PRIMID® XL-552) (g) | 42 | 42 | 42 | 30 | 30 | 30 | 30 | 54 | 30 | 30 | 30 | 42 | 42 |
| Ratio of amount Polyester:amount Crosslinker | 93:7 | 93:7 | 93:7 | 95:5 | 95:5 | 95:5 | 95:5 | 91:9 | 95:5 | 95:5 | 95:5 | 93:7 | 93:7 |
| Kronos® 2160 (g) | 300 | 300 | 300 | 300 | 300 | 300 | 300 | 300 | 300 | 300 | 300 | 300 | 300 |
| Resiflow® PV 5 (g) | 9 | 9 | 9 | 9 | 9 | 9 | 9 | 9 | 9 | 9 | 9 | 9 | 9 |
| Benzoin (g) | 3 | 3 | 3 | 3 | 3 | 3 | 3 | 3 | 3 | 3 | 3 | 3 | 3 |

TABLE 5-continued

Composition of thermosetting powder coating compositions PCC15-PCC27.

|  | 49 | 50 | 51 | 52 | 53 | 54 | 55 | 56 | 57 | 58 | 59 | 60 | 61 |
|---|---|---|---|---|---|---|---|---|---|---|---|---|---|
|  | THERMOSETTING POWDER COATING COMPOSITION ||||||||||||||
|  | PCC15 | PCC16 | PCC17 | PCC18 | PCC19 | PCC20 | PCC21 | PCC22 | PCC23 | PCC24 | PCC25 | PCC26 | PCC27 |
| Properties of the Thermosetting Powder Coating Composition | | | | | | | | | | | | | |
| Storage stability after 28 days at 40° C. (1-10, 10 best) | 1 | 1 | n.m. | 3 | n.m. | 1 | 1 | n.m. | 1 | n.m. | n.m. | 1 | 1 |

TABLE 6

Composition of thermosetting powder coating compositions PCC28-PCC34.

|  | 62 | 63 | 64 | 65 | 66 | 67 | 68 |
|---|---|---|---|---|---|---|---|
|  | THERMOSETTING POWDER COATING COMPOSITION |||||||
|  | PCC28 | PCC29 | PCC30 | PCC31 | PCC32 | PCC33 | PCC34 |
| Polyester & weight (g) | PR28 (558) | PR29 (558) | PR30 (558) | PR31 (558) | PR32 (558) | PR33 (558) | PR34 (558) |
| Crosslinker (PRIMID ® XL-552) (g) | 42 | 42 | 42 | 42 | 42 | 42 | 42 |
| Ratio of amount Polyester:amount Crosslinker | 93:7 | 93:7 | 93:7 | 93:7 | 93:7 | 93:7 | 93:7 |
| Kronos ® 2160 (g) | 300 | 300 | 300 | 300 | 300 | 300 | 300 |
| Resiflow ® PV 5 (g) | 9 | 9 | 9 | 9 | 9 | 9 | 9 |
| Benzoin (g) | 3 | 3 | 3 | 3 | 3 | 3 | 3 |
| Properties of the Thermosetting Powder Coating Composition | | | | | | | |
| Storage stability after 28 days at 40° C. (1-10, 10 best) | 9 | 9 | 9 | 7 | 9 | 8 | 7 |

Examples 69-102

Preparation of Powder Coatings CompPC1, CompPC2, CompPC3, PC4-PC34 (Examples 69-102) Based on the Thermosetting Powder Coating Compositions CompPCC1, CompPCC2, CompPCC3, PCC4-PCC34 (Examples 35-68): General Procedure The thermosetting powder coating compositions CompPCC1, CompPCC2, CompPCC3, PCC4-PCC34 prepared in Examples 69-102 (Tables 7, 8, 9) were electrostatically sprayed (corona, 60 kV) onto the desired test panels and cured at temperatures appropriate to the test method or as indicated in Tables 7, 8 and 9. They afforded white colored powder coatings.

TABLE 7

Properties of the powder coatings CompPC1, CompPC2, CompPC3, PC4-PC14 derived upon cure of the thermosetting powder coating compositions CompPCC1, CompPCC2, CompPCC3, PCC4-PCC14.

|  | 69 | 70 | 71 | 72 | 73 | 74 | 75 | 76 |
|---|---|---|---|---|---|---|---|---|
|  | POWDER COATING ||||||||
|  | Comp PC1 | Comp PC2 | Comp PC3 | PC4 | PC5 | PC6 | PC7 | PC8 |
| RIR of 60 inch/lbs @ 155° C./15 min | Pass | Pass | Pass | Pass | Pass | Pass | Pass | Pass |
| Gloss 20°/60° | 88/96 | 75/94 | 72/94 | 87/96 | 85/96 | 88/96 | 88/96 | 85/95 |
| Haze | 45 | 127 | 208 | 45 | 68 | 42 | 38 | 59 |
| Temperature range blooming occured | 127-155° C. | 125-155° C. | 125-150° C. | 125-150° C. | 140-160 | 140-152 | 135-150 | 137-151 |

TABLE 7-continued

Properties of the powder coatings CompPC1, CompPC2, CompPC3, PC4-PC14 derived upon cure of the thermosetting powder coating compositions CompPCC1, CompPCC2, CompPC3, PCC4-PCC14.

| Blooming assessment | | Extensive Blooming | Extensive Blooming | Extensive Blooming | Extensive Blooming | Limited Blooming | Limited Blooming | Limited Blooming | Limited Blooming |
|---|---|---|---|---|---|---|---|---|---|
| Smoothness | | 3 | 3 | 3 | 6 | 2 | 3 | 3 | 3 |
| QUV-B (h) | | 370 | 380 | n.m. | 337 | n.m. | n.m. | n.m. | n.m. |
| Storage stability after 28 days at 40° C. (1-10, 10 best) of the corresponding thermosetting powder coating composition | | n.m. | n.m. | n.m. | n.m. | n.m. | n.m. | n.m. | n.m. |
| Yellowing Resistance | Overbake ($\Delta b^*/\Delta E^*$) @ 240° C./10 min | 1.3/1.7 | n.m. | n.m. | n.m. | n.m. | n.m. | n.m. | n.m. |
| | Overbake ($\Delta b^*/\Delta E^*$) @ 220° C./60 min | 4.8/6.3 | n.m. | n.m. | n.m. | n.m. | n.m. | n.m. | n.m. |
| | NOx ($\Delta b^*/\Delta E^*$) @ 185° C./20 min | 3.5/3.6 | n.m. | n.m. | n.m. | n.m. | n.m. | n.m. | n.m. |
| Resistance to humidity (Blanching) ($\Delta L^*/\Delta E^*$) upon 4 h at 60° C. | | 1.4/1.4 | n.m. | n.m. | n.m. | n.m. | n.m. | n.m. | n.m. |
| Degassing Limit (μm) | | 95 | n.m. | n.m. | n.m. | n.m. | n.m. | >95 | >120 |

| | | 77 | 78 | 79 | 80 | 81 | 82 |
|---|---|---|---|---|---|---|---|
| | | \multicolumn{6}{c}{POWDER COATING} | | | | | |
| | | PC9 | PC10 | PC11 | PC12 | PC13 | PC14 |
| RIR of 60 inch/lbs @ 155° C./15 min | | Pass | Pass | Fail | Fail | Fail | Fail |
| Gloss 20°/60° | | 83/95 | 85/95 | 86/96 | 89/96 | 88/95 | 87/95 |
| Haze | | 79 | 63 | 54 | 31 | 33 | 29 |
| Temperature range blooming occured | | none | 128-152 | —* | — | 140-156 | none |
| Blooming assessment | | No blooming | Limited Blooming | No blooming | No blooming | Limited Blooming | No blooming |
| Smoothness | | 2 | 3 | 5 | 6 | 4 | 5 |
| QUV-B (h) | | n.m. | 311 | 447 | 328 | n.m. | 442 |
| Storage stability after 28 days at 40° C. (1-10, 10 best) of the corresponding thermosetting powder coating composition | | n.m. | 9 | n.m. | n.m. | 1 | 8 |
| Yellowing Resistance | Overbake ($\Delta b^*/\Delta E^*$) @ 240° C./10 min | n.m. | n.m. | n.m. | n.m. | n.m. | n.m. |
| | Overbake ($\Delta b^*/\Delta E^*$) @ 220° C./60 min | n.m. | n.m. | n.m. | n.m. | n.m. | n.m. |
| | NOx ($\Delta b^*/\Delta E^*$) @ 185° C./20 min | n.m. | n.m. | n.m. | n.m. | n.m. | n.m. |
| Resistance to humidity (Blanching) ($\Delta L^*/\Delta E^*$) upon 4 h at 60° C. | | n.m. | n.m. | n.m. | n.m. | n.m. | n.m. |
| Degassing Limit (μm) | | 110 | 120 | 110 | 145 | n.m. | 110 | n.m.: not measured
*blooming was not observed at any temperature

TABLE 8

Properties of the powder coatings PC15-PC27 derived upon cure of the thermosetting powder coating compositions PCC15-PCC27.

| | 83 | 84 | 85 | 86 | 87 | 83 | 89 |
|---|---|---|---|---|---|---|---|
| | \multicolumn{7}{c}{POWDER COATING} | | | | | | |
| | PC15 | PC16 | PC17 | PC18 | PC19 | PC20 | PC21 |
| RIR of 60 inch/lbs @ 155° C./15 min | Pass | Pass | Pass | Pass | Pass | Pass | Pass |
| Gloss 20°/60° | 86/95 | 86/95 | 90/97 | 87/96 | 90/97 | 87/95 | 88/95 |
| Haze | 36 | 33 | 32 | 42 | 27 | 34 | 33 |
| Temperature range blooming occured | 122-140° C. | 122-140° C. | —* | 125-135° C. | — | — | 138-150 |
| Blooming assessment | Limited Blooming | Limited Blooming | No blooming | Limited Blooming | No blooming | No blooming | Limited Blooming |
| Smoothness | 4 | 5 | 6 | 5 | 5 | 6 | 5 |
| QUV-B (h) | 413 | 413 | 385 | 335 | 335 | n.m. | n.m. |
| Storage stability after 28 days at 40° C. (1-10, 10 best) of the corresponding thermosetting powder coating composition | 1 | 1 | n.m. | 3 | n.m. | 1 | 1 |

TABLE 8-continued

Properties of the powder coatings PC15-PC27 derived upon cure of the thermosetting powder coating compositions PCC15-PCC27.

| | | | | | | | | |
|---|---|---|---|---|---|---|---|---|
| Yellowing Resistance | Overbake (Δ b*/Δ E*) @ 240° C./10 min | n.m. | n.m. | n.m. | 1.2/1.2 | n.m. | n.m. | n.m. |
| | Overbake (Δ b*/Δ E*) @ 220° C./60 min | n.m. | n.m. | n.m. | 1.3/1.4 | n.m. | n.m. | n.m. |
| | NOx (Δ b*/Δ E*) @ 185° C./20 min | n.m. | n.m. | n.m. | 1.0/1.1 | n.m. | n.m. | n.m. |
| Resistance to humidity (Blanching) (ΔL*/ΔE*) upon 4 h at 60° C. | | n.m. | n.m. | n.m. | n.m. | n.m. | n.m. | n.m. |
| Degassing Limit (μm) | | n.m. | n.m. | n.m. | 152 | 155 | >100 | n.m. |

| | | 90 | 91 | 92 | 93 | 94 | 96 |
|---|---|---|---|---|---|---|---|
| | | \multicolumn{6}{c}{POWDER COATING} | | | | | |
| | | PC22 | PC23 | PC24 | PC25 | PC26 | PC27 |
| RIR of 60 inch/lbs @ 155° C./15 min | | Pass | Pass | Pass | Pass | Pass | Pass |
| Gloss 20°/60° | | 84/95 | 87/95 | 88/95 | 87/95 | 88/95 | 88/95 |
| Haze | | 75 | 29 | 30 | 38 | 29 | 31 |
| Temperature range blooming occured | | — | 135-148 | 131-148 | 131-148 | — | — |
| Blooming assessment | | No blooming | Limited Blooming | Limited Blooming | Limited Blooming | No blooming | No blooming |
| Smoothness | | 5 | 5 | 5 | 4 | 5 | 5 |
| QUV-B (h) | | n.m. | n.m. | n.m. | n.m. | 401 | 390 |
| Storage stability after 28 days at 40° C. (1-10, 10 best) of the corresponding thermosetting powder coating composition | | n.m. | 1 | n.m. | n.m. | 1 | 1 |
| Yellowing Resistance | Overbake (Δ b*/Δ E*) @ 240° C./10 min | n.m. | n.m. | n.m. | n.m. | n.m. | n.m. |
| | Overbake (Δ b*/Δ E*) @ 220° C./60 min | n.m. | n.m. | n.m. | n.m. | n.m. | n.m. |
| | NOx (Δ b*/Δ E*) @ 185° C./20 min | n.m. | n.m. | n.m. | n.m. | n.m. | n.m. |
| Resistance to humidity (Blanching) (ΔL*/ΔE*) upon 4 h at 60° C. | | n.m. | n.m. | n.m. | n.m. | n.m. | n.m. |
| Degassing Limit (μm) | | n.m. | >100 | 120 | 115 | 115 | 115 | n.m.: not measured
*blooming was not observed at any temperature

TABLE 9

Properties of the powder coatings PC28-PC34 derived upon cure of the thermosetting powder coating compositions PCC28-PCC34.

| | 96 | 97 | 93 | 99 | 100 | 101 | 102 |
|---|---|---|---|---|---|---|---|
| | \multicolumn{7}{c}{POWDER COATING} | | | | | | |
| | PC28 | PC29 | PC30 | PC31 | PC32 | PC33 | PC34 |
| RIR of 60 inch/lbs @ 155° C./15 min | Pass | Pass | Pass | Pass | Pass | Pass | Pass |
| Gloss 20/60° | 88/96 | 88/96 | 86/95 | 88/98 | 87/95 | 88/95 | 87/95 |
| Haze | 40 | 46 | 42 | 36 | 42 | 37 | 87 |
| Temperature range blooming occured | —* | — | — | — | — | — | — |
| Blooming assessment | No blooming | No blooming | No blooming | No blooming | No blooming | No blooming | No blooming |
| Smoothness | 5 | 4 | 4 | 4 | 4 | 4 | 5 |
| QUV-B (h) | 439 | 420 | 347 | 371 | 411 | 400 | 407 |
| Storage stability after 28 days at 40° C. (1-10, 10 best) of the corresponding thermosetting powder coating composition | 9 | 9 | 9 | 7 | 9 | 8 | 7 |
| Yellowing Resistance Overbake (Δ b*/Δ E*) @ 240° C./10 min | 0.9/1.0 | n.m. | n.m. | n.m. | n.m. | n.m. | n.m. |
| Overbake (Δ b*/Δ E*) @ 220° C./60 min | 2.1/2.3 | n.m. | n.m. | n.m. | n.m. | n.m. | n.m. |
| NOx (Δ b*/Δ E*) @ 185° C./20 min | 2.4/2.5 | n.m. | n.m. | n.m. | n.m. | n.m. | n.m. |
| Resistance to humidity (Blanching) (ΔL*/ΔE*) upon 4 h at 60° C. | 0.5/0.6 | n.m. | n.m. | n.m. | n.m. | n.m. | n.m. |
| Degassing Limit (μm) | 105 | 110 | 110 | >95 | 105 | 110 | 110 | n.m.: not measured
*blooming was not observed at any temperature

As can be seen from the Examples in Tables 7, 8 and 9:
a) Powder coatings that have at least two of the following properties: limited to no blooming at curing temperatures higher than 145° C., a smoothness of at least PCI 4 and a reverse impact resistance of 60 inch/lbs at 155° C./15 min cure can be prepared from a thermosetting powder coating composition comprising a crosslinker and a polyester
wherein the polyester has functional groups which functional groups are capable of reacting with β-hydroxyalkylamide groups,
wherein the polyester is prepared from at least the following monomers: neopentylglycol, a difunctional alcohol other than neopentylglycol; isophthalic acid, terephthalic acid, optionally adipic acid and a branching monomer chosen from the group of an at least trifunctional carboxylic acid, an at least trifunctional alcohol, an at least trifunctional hydroxy carboxylic acid and mixtures thereof,
wherein the amount of difunctional alcohol other than neopentylglycol in the polyester ranges from 1 to 50% w/w based on the polyester,
wherein the amount of isophthalic acid in the polyester ranges from 6 to 35% w/w based on the polyester,
wherein the polyester has a functionality of at least 2.1,
wherein the crosslinker is a compound having β-hydroxyalkylamide groups.
This can be seen by comparing examples 69, 70 and 71 with 72-102.

b) Powder coatings that have limited to no blooming at curing temperatures higher than 145° C. and at least one of the following two properties: a smoothness of at least PCI 4 and a reverse impact resistance of 60 inch/lbs at 155° C./15 min cure, can be prepared from a thermosetting powder coating composition comprising a crosslinker and a polyester
wherein the polyester has functional groups which functional groups are capable of reacting with β-hydroxyalkylamide groups,
wherein the polyester is prepared from at least the following monomers: neopentylglycol, a difunctional alcohol other than neopentylglycol; isophthalic acid, terephthalic acid, optionally adipic acid and a branching monomer chosen from the group of an at least trifunctional carboxylic acid, an at least trifunctional alcohol, an at least trifunctional hydroxy carboxylic acid and mixtures thereof,
wherein the amount of difunctional alcohol other than neopentylglycol in the polyester ranges from 1 to 50% w/w based on the polyester,
wherein the amount of isophthalic acid in the polyester ranges from 7 to 35% w/w based on the polyester,
wherein the polyester has a functionality of at least 2.1,
wherein the crosslinker is a compound having β-hydroxyalkylamide groups.
This can be seen from Tables 7, 8 and 9 by comparing examples 69, 70 and 71 and 72 with 73-102.

c) Powder coatings that have limited to no blooming at curing temperatures higher than 145° C. and a smoothness of at least PCI 4 can be prepared from a thermosetting powder coating composition comprising a crosslinker and a polyester
wherein the polyester has functional groups which functional groups are capable of reacting with β-hydroxyalkylamide groups,
wherein the polyester is prepared from at least the following monomers: neopentylglycol, a difunctional alcohol other than neopentylglycol; isophthalic acid, terephthalic acid, optionally adipic acid and a branching monomer chosen from the group of an at least trifunctional carboxylic acid, an at least trifunctional alcohol, an at least trifunctional hydroxy carboxylic acid and mixtures thereof,
wherein the amount of difunctional alcohol other than neopentylglycol in the polyester ranges from 1 to 11% w/w based on the polyester,
wherein the amount of isophthalic acid in the polyester ranges from 7 to 35% w/w based on the polyester,
wherein the polyester has a functionality of at least 2.1,
wherein the polyester has a viscosity of at most 56 Pa·s measured at 160° C. using as a cone and plate rheometer the Brookfield CAP 2000+ Viscometer with spindle CAP-S-05 at 21 rpm (shear rate 70 s$^{-1}$).
wherein the crosslinker is a compound having β-hydroxyalkylamide groups.
This can be seen by comparing examples 69-78 with examples 79-102.

d) Powder coatings that have limited to no blooming at curing temperatures higher than 145° C., a smoothness of at least PCI 4 and a reverse impact resistance of 60 inch/lbs at 155° C./15 min cure, can be prepared from a thermosetting powder coating composition comprising a crosslinker and a polyester
wherein the crosslinker is a compound having β-hydroxyalkylamide groups;
wherein the polyester has functional groups which functional groups are capable of reacting with β-hydroxyalkylamide groups,
wherein the polyester is prepared from at least the following monomers: neopentylglycol, a difunctional alcohol other than neopentylglycol; isophthalic acid, terephthalic acid, adipic acid and a branching monomer chosen from the group of an at least trifunctional carboxylic acid, an at least trifunctional alcohol, an at least trifunctional hydroxy carboxylic acid and mixtures thereof,
wherein the amount of isophthalic acid in the polyester ranges from 7 to 30% w/w based on the polyester,
wherein the amount of adipic acid in the polyester ranges from 1 to 10% w/w based on the polyester,
wherein the polyester has a functionality of at least 2.1,
wherein the polyester has a viscosity of at most 56 Pa·s measured at 160° C. using as a cone and plate rheometer the Brookfield CAP 2000+ Viscometer with spindle CAP-S-05 at 21 rpm (shear rate 70 s$^{-1}$) and
wherein the difunctional alcohol other than neopentylglycol ranges from 8 to 11% w/w based on the polyester when the difunctional alcohol other than neopentyl glycol is 2-methyl-1,3-propanediol or
wherein the difunctional alcohol other than neopentylglycol ranges from 1 to 10% w/w based on the polyester when the difunctional alcohol other than neopentyl glycol is a difunctional alcohol other than neopentylglycol and 2-methyl-1,3-propanediol.
This can be seen by comparing examples 69-82 with examples 83-102.

e) Powder coatings that have limited to no blooming at curing temperatures higher than 145° C., a smoothness of at least PCI 4 and a reverse impact resistance of 60 inch/lbs at 155° C./15 min cure can be prepared from a thermosetting powder coating composition comprising a crosslinker and a polyester wherein the polyester has functional groups which functional groups are capable of reacting with β-hydroxyalkylamide groups, wherein the polyester is prepared from at least the following monomers: neopentylglycol, a difunctional alcohol other than neopentylglycol; isophthalic acid, terephthalic acid, adipic acid and a branching monomer chosen from the group of an at least trifunctional carboxylic acid, an at least trifunctional alcohol, an at least trifunctional hydroxy carboxylic acid and mixtures thereof, wherein the amount of difunctional alcohol other than neopentylglycol in the polyester ranges from 1 to 5% w/w based on the polyester, wherein the amount of isophthalic acid in the polyester ranges from 7 to 30% w/w based on the polyester, wherein the polyester has a functionality of at least 2.1, wherein the polyester has a viscosity of at most 56 Pa·s measured at 160° C. using as a cone and plate rheometer the Brookfield CAP 2000+ Viscometer with spindle CAP-S-05 at 21 rpm (shear rate 70 s$^{-1}$).

wherein the crosslinker is a compound having β-hydroxyalkylamide groups.

This can be seen by comparing examples 69-95 with examples 96-102. An additional advantage of these thermosetting powder coating composition is that they have a storage stability that is at least 6 after 28 days at 40° C.

f) Powder coatings having better yellowing resistance, resistance to humidity and degassing limit can be prepared from the thermosetting powder compositions of the present invention.

This can be seen by comparing Example 69 with Examples 86 and 96.

g) Upon comparing the smoothness results of example PC15 (Example 83) with PC16 (Example 84) and PC28 (Example 96) with PC29 (Example 97) and these in their turn based on PR15, PR16, PR28 and PR29, it becomes clear that the presence of the processing additive $X_n$-$Y_m$ in the thermosetting powder coating composition, increases the smoothness of the powder coating.

h) Upon comparing QUV-B results of PC15 and PC17 (Examples 83, 85), it becomes evident that the introduction of neopentylglycol-hydroxypivalic acid ester as a monomer (2$^{nd}$ dialcohol) in the polyester which is present in PCC15 and not in PCC17, improves outdoor durability assessed via QUV-B. Thus, the presence of neopentylglycol-hydroxypivalic acid ester in the polyester in the thermosetting powder coating composition of the present invention is preferred when the resulting powder coating is used for outdoor applications.

Examples 103-110

Preparation of Powder Coatings PC35-PC38 (Examples 103-106) Based on the Thermosetting Powder Coating Composition PCC18 and Preparation of Powder Coatings PC39-PC42 (Examples 107-110) Based on the Thermosetting Powder Coating Composition PCC28: General Procedure The thermosetting powder coating compositions PCC18 and PCC28, prepared in Examples 52 and 62, were electrostatically sprayed (corona, 60 kV) onto the desired test panels and cured at different temperatures and times as indicated in Tables 10 and 11.

In order to assess the suitability of the thermosetting powder coating compositions of the invention for low temperature cure and/or fast cure (short curing time) at elevated temperatures, a blooming-free thermosetting powder coating composition, PCC18 (Example 52) was selected and cured in an air-circulation oven at four different curing conditions (see Table 10), thus affording PC35-PC38 (Examples 103-106), respectively. ALQ-46 panels were used for Examples 103-106. From the results of Table 10, it is evident that the thermosetting powder coating compositions of the invention can afford blooming-free, smooth coatings (smoothness equal/higher to 4) with preferably also the ability to pass the test of reverse impact resistance as executed according to ASTM D 2794, when cured at low temperature (140° C./30 min) (Example 103) or when cured at elevated temperature for significantly shorter time (200° C./3 min) (Example 106), without any of the aforementioned properties (smoothness, RIR and blooming) being adversely affected.

TABLE 10

Properties of PC35-38 (Examples 103-106) based on PCC18 (Example 52)

| | 103 | 104 | 105 | 106 |
|---|---|---|---|---|
| | | POWDER COATING | | |
| | PC35 | PC36 | PC37 | PC38 |
| RIR of 60 inch/lbs ('pass') @ curing conditions (temperature and time) indicated | 140° C./ 30 min | 155° C./ 12 min | 180° C./ 6 min | 200° C./ 3 min |
| Gloss 20°/60° | 82/92 | 87/96 | 87/95 | 80/92 |
| Haze | 45 | 42 | 49 | 47 |
| Blooming assessment | No blooming | No blooming | No blooming | No blooming |
| Smoothness | 5 | 5 | 5 | 5 |

From Table 10, it becomes clear that that the thermosetting powder coating compositions of the present invention are also very suitable for curing at various curing conditions, for example ranging from curing at 140° C. for 30 minutes to curing at 200° C. for 3 minutes, while at the same time being able to provide powder coatings having no blooming, and also having a smoothness of at least PCI 4 and preferably also being able to pass the reverse impact resistance test and/or having a low haze.

In addition, another blooming-free powder coating thermosetting composition, PCC28 (Example 96) was selected and cured in an air-circulation oven at four different curing conditions (see Table 11), thus affording PC39 and PC40-42 (Examples 107-110). ALQ-46 panels were also used for these Examples. From the results of Table 11, it is evident that the thermosetting powder coating compositions of the invention can afford blooming-free, smooth coatings (smoothness equal/higher to 4) with preferably also the ability to pass the test of reverse impact resistance as executed according to ASTM D 2794, when cured at low temperature (145° C./30 min) (Example 107) or when cured at elevated temperature for significantly shorter time (180° C./5 min) (Example 110), without any of the aforementioned properties (smoothness, RIR and blooming) being adversely affected. The difference from the PCC18 mentioned and tested in a similar way herein above is that the PCC28 combines also has an improved storage stability (see Table 9, Example 96) as compared to PCC18.

TABLE 11

Properties of PC39, PC28, and PC40-42 (Examples 107, 96 and 108-110) based on PCC28 (Example 62)

| | 107 | 96 | 108 | 109 | 110 |
|---|---|---|---|---|---|
| | | | POWDER COATING | | |
| | PC39 | PC28 | PC40 | PC41 | PC42 |
| RIR of 160 inch/lbs ('pass') @ curing conditions (temperature and time) indicated | 145° C./ 30 min | n.m. | 160° C./ 10 min | 175° C./6 min | n.m. |
| RIR of 60 inch/lbs ('pass') @ curing conditions (temperature and time) indicated | 145° C./ 30 min | 155° C./ 15 min | 160° C./ 10 min | 175° C./6 min | 180° C./5 min |
| Gloss 20°/60° | n.m. | 88/96 | n.m. | n.m. | 86/95 |
| Haze | n.m. | 40 | n.m. | n.m. | 43 |
| Blooming assessment | n.m. | No blooming | n.m. | n.m. | No blooming |
| Smoothness | n.m. | 5 | n.m. | n.m. | 5 |

The properties of the thermosetting powder coating compositions of the invention such as the PCC18 and PCC28 make them suitable for powder coating heat and non-heat sensitive substrates and also for increasing throughput of typical powder coating lines.

Examples 111-113

Preparation of Thermosetting Powder Coating Compositions CompPCC1BR, PCC18BR and PCC28BR (Examples 111-113) Based on Polyesters CompR1, PR18 and PR28 (Examples 1, 18 and 28): Chemicals Used and General Procedure The chemicals used to prepare the thermosetting powder coating compositions CompPCC1BR, PCC18BR and PCC28BR in the following examples are described in Table 12. Primid® XL-552 is a crosslinker from EMS Chemie ($T_m$=120-124° C., hydroxyl value 620-700 mg KOH/g of the Primid® XL-552), $BaSO_4$ (filler) was supplied by Sachtleben, Resiflow® PV 5 is a flow control agent from Worlée-Chemie GmbH, Printex 300 (black pigment) was supplied by Degussa, Bayferrox Red 130 M (red pigment) and Bayferrox 920 (yellow pigment) were supplied by Necarbo and Sicotan Yellow L 2010 (yellow pigment) was supplied by BASF.

The thermosetting powder coating compositions were prepared by mixing the components presented in Table 12, in a blender and subsequently extruding in a PRISM TSE16 PC twin screw at 120° C. with a screw speed of 200 rpm. The extrudate was allowed to cool to room temperature and broken into chips. The chips were milled in a Retsch ZM100 with a 0.5 mm ring sieve at 18000 rpm and then sieved. The sieve fraction with particle size below 90 μm was collected.

TABLE 12

Composition of thermosetting powder coating compositions CompPCC1BR, PCC18BR and PCC28BR.

| | 111 | 112 | 113 |
|---|---|---|---|
| | THERMOSETTING POWDER COATING COMPOSITION | | |
| | CompPCC1BR | PCC18BR | PCC28BR |
| Polyester & weight (g) | CompPR1 (558) | EC1 (570) | EC2 (558) |
| Crosslinker (PRIMID ® XL-552) (g) | 42 | 30 | 42 |
| Ratio of amount Polyester:amount Crosslinker | 93:7 | 95:5 | 93:7 |

TABLE 12-continued

Composition of thermosetting powder coating compositions CompPCC1BR, PCC18BR and PCC28BR.

| | 111 | 112 | 113 |
|---|---|---|---|
| | THERMOSETTING POWDER COATING COMPOSITION | | |
| | CompPCC1BR | PCC18BR | PCC28BR |
| $BaSO_4$ (g) | 150 | 150 | 150 |
| Printex 300 (g) | 2.6 | 2.6 | 2.6 |
| Bayferrox red 130 M (g) | 11.4 | 11.4 | 11.4 |
| Bayferrox 920 (g) | 17.4 | 17.4 | 17.4 |
| Sicotan Yellow L 2010 (g) | 13.4 | 13.4 | 13.4 |
| Resiflow ® PV 5 (g) | 9 | 9 | 9 |
| Benzoin (g) | 3.6 | 3.6 | 3.6 |
| Properties of the Powder Coating Composition | | | |
| Storage stability after 28 days at 40° C. (1-10, 10 best) | 9 | 1 | 9 |

Preparation of Brown Powder Coatings CompPC1BR, PC18BR and PC28BR (Examples 114-116) Based on the Thermosetting Powder Coating Compositions CompPCC1BR, PCC18BR and PCC28BR: General Procedure The thermosetting powder coating compositions CompPCC1BR, PCC18BR and PCC28BR, prepared in Examples 111, 112, 113, respectively were electrostatically sprayed (corona, 60 kV) onto the desired test panels and cured at 160° C. for 15 minutes. They afforded brown colored powder coatings.

TABLE 13

Properties of CompPC1BR, PC18BR and PC28BR (Examples 114-116) based on the thermosetting powder coating compositions CompPCC1BR, PCC18BR and PCC28BR.

| | 114 | 115 | 116 |
|---|---|---|---|
| | POWDER COATING | | |
| | CompPC1BR | PC18BR | PC28BR |
| Gloss 20°/60° | 85/94 | 89/95 | 85/94 |
| Haze | 62 | 40 | 71 |
| Temperature range blooming occured | 124-155° C. | 129-140° C. | —* |
| Blooming assessment | Extensive Blooming | Limited Blooming | No Blooming |
| Smoothness | 3 | 5 | 5 |

TABLE 13-continued

Properties of CompPC1BR, PC18BR and PC28BR (Examples 114-116) based on the thermosetting powder coating compositions CompPCC1BR, PCC18BR and PCC28BR.

| | 114 | 115 | 116 |
|---|---|---|---|
| | POWDER COATING | | |
| | CompPC1BR | PC18BR | PC28BR |
| Storage stability after 28 days at 40° C. (1-10, 10 best) of the corresponding thermosetting powder coating composition | 9 | 1 | 9 |
| QUV-B (h) | 300 | 250 | 320 |
| Resistance to humidity (Blanching) (ΔL*/ΔE*) upon 4 h at 60° C. | 1.4/1.4 | n.m. | 0.5/0.6 | n.m.: not measured
*blooming was not observed at any temperature

From Table 13, it becomes evident that the thermosetting powder coating compositions of the present invention can be formulated not only in white formulations but also in colored (e.g. brown) formulations to provide powder coatings that have at least two of the following three coating properties: limited to no blooming, sufficient reverse impact resistance and acceptable smoothness.

The invention claimed is:

1. A thermosetting powder coating composition comprising a crosslinker and a polyester, wherein
   the crosslinker is a compound having β-hydroxyalkylamide groups, and wherein
   the polyester is a carboxylic acid functional polyester, and wherein
   the polyester has functional groups capable of reacting with β-hydroxyalkylamide groups, and wherein
   the polyester is prepared from at least the following monomers: neopentylglycol, a difunctional alcohol other than neopentyl glycol (DFA); isophthalic acid (IPA), terephthalic acid (TPA), optionally adipic acid, and a branching monomer selected from the group consisting of at least trifunctional carboxylic acid, an at least trifunctional alcohol, at least trifunctional hydroxy carboxylic acid, and mixtures thereof, and wherein
   the DFA is present in the polyester from 1 to 50% w/w, and wherein
   the IPA is present in the polyester from 6 to 30% w/w, and wherein
   the molar ratio of TPA to IPA is at least 1.1, and wherein
   the polyester has a functionality of at least 2.1 and at most 4.0, and wherein
   the polyester has an acid value of at most 65 mg KOH/g, and wherein
   the polyester has a hydroxyl value of at most 14 mg KOH/g, and wherein
   the polyester has a glass transition temperature of at least 20° C. and of at most 120° C. measured via DSC at a heating rate of 5° C./min, and wherein
   the polyester has a viscosity of at most 200 Pa·s measured at 160° C. using a cone and plate rheometer Brookfield CAP 2000+ Viscometer with spindle CAP-S-05 at 21 rpm and a shear rate 70 s-1 and wherein
   % w/w is based on the polyester.

2. The thermosetting powder coating composition according to claim 1, wherein the amount of IPA in the polyester ranges from 7 to 30% w/w.

3. The thermosetting powder coating composition according to claim 1, wherein the amount of adipic acid in the polyester ranges from 1 to 10% w/w.

4. The thermosetting powder coating composition according to claim 1, wherein IPA is present in the polyester in an amount of at most 40% mole based on the aromatic acid monomer.

5. The thermosetting powder coating composition according to claim 1, wherein the polyester has a theoretical number average molecular weight ranging from 1000 to 10000 g/mol.

6. The thermosetting powder coating composition according to claim 1, wherein the polyester has a functionality of at most 3.

7. The thermosetting powder coating composition according to claim 1, wherein the polyester has an acid value of at least 15 mg KOH/g.

8. The thermosetting powder coating composition according to claim 1, wherein the polyester has an acid value of at least 30 mg KOH/g.

9. The thermosetting powder coating composition according to claim 1, wherein the polyester has an acid value of at most 60 mg KOH/g.

10. The thermosetting powder coating composition according to claim 1, wherein the DFA is selected from the group consisting of ethylene glycol, neopentyl glycol-hydroxypivalic acid ester, 1,6-hexanediol and mixtures thereof.

11. The thermosetting powder coating composition according to claim 1, wherein the DFA is 1,6-hexanediol.

12. The thermosetting powder coating composition according to claim 1, wherein the thermosetting powder coating composition has a glass transition temperature of at least 20° C. and of at most 100° C.

13. The thermosetting powder coating composition according to claim 1, wherein the ratio between the amount of the polyester and the amount of crosslinker is in the range of from 85:15 to 99:1.

14. The thermosetting powder coating composition according to claim 1, wherein the polyester has a theoretical number average molecular weight ranging from 1000 to 10000 g/mol, and wherein the polyester has an acid value of at least 15 mg KOH/g, and wherein the thermosetting powder coating composition has a glass transition temperature of at least 20° C. and of at most 100° C., and wherein the ratio between the amount of the polyester and the amount of crosslinker is in the range of from 85:15 to 99:1.

15. The thermosetting powder coating composition according to claim 1, wherein the polyester has a theoretical number average molecular weight ranging from 1000 to 10000 g/mol, and wherein the polyester has a functionality of at most 3, and wherein the polyester has an acid value of at least 15 mg KOH/g, and wherein the thermosetting powder coating composition has a glass transition temperature of at least 20° C. and of at most 100° C., and wherein the ratio between the amount of the polyester and the amount of crosslinker is in the range of from 85:15 to 99:1.

16. The thermosetting powder coating composition according to claim 1, wherein the polyester has a theoretical number average molecular weight ranging from 1000 to 10000 g/mol, and wherein the polyester has an acid value of at least 30 mg KOH/g, and wherein the thermosetting powder coating composition has a glass transition temperature of at least 20° C. and of at most 100° C., and wherein the ratio between the amount of the polyester and the amount of crosslinker is in the range of from 85:15 to 99:1.

17. The thermosetting powder coating composition according to claim 1, wherein the polyester has a theoretical number average molecular weight ranging from 1000 to 10000 g/mol, and wherein the polyester has a functionality of at most 3, and wherein the polyester has an acid value of at least 30 mg KOH/g, and wherein the thermosetting powder coating composition has a glass transition temperature of at least 20° C. and of at most 100° C., and wherein the ratio between the amount of the polyester and the amount of crosslinker is in the range of from 85:15 to 99:1.

18. The thermosetting powder coating composition according to claim 1, wherein the amount of IPA in the polyester ranges from 7 to 30% w/w and the amount of adipic acid in the polyester ranges from 1 to 10% w/w.

19. The thermosetting powder coating composition according to claim 14, wherein the amount of adipic acid in the polyester ranges from 1 to 10% w/w.

20. The thermosetting powder coating composition according to claim 15, wherein the amount of adipic acid in the polyester ranges from 1 to 10% w/w.

21. The thermosetting powder coating composition according to claim 16, wherein the amount of adipic acid in the polyester ranges from 1 to 10% w/w.

22. The thermosetting powder coating composition according to claim 17, wherein the amount of adipic acid in the polyester ranges from 1 to 10% w/w.

23. The thermosetting powder coating composition according to claim 1, wherein the DFA is 1,6-hexanediol.

24. The thermosetting powder coating composition according to claim 15, wherein the DFA is 1,6-hexanediol.

25. The thermosetting powder coating composition according to claim 16, wherein the DFA is 1,6-hexanediol.

26. The thermosetting powder coating composition according to claim 17, wherein the DFA is 1,6-hexanediol.

27. The thermosetting powder coating composition according to claim 18, wherein the DFA is 1,6-hexanediol.

28. The thermosetting powder coating composition according to claim 19, wherein the DFA is 1,6-hexanediol.

29. The thermosetting powder coating composition according to claim 20, wherein the DFA is 1,6-hexanediol.

30. The thermosetting powder coating composition according to claim 21, wherein the DFA is 1,6-hexanediol.

31. The thermosetting powder coating composition according to claim 22, wherein the DFA is 1,6-hexanediol.

32. The thermosetting powder coating composition according to claim 2, wherein the amount of DFA in the polyester ranges from 1 to 11% w/w, and wherein the polyester has a viscosity of at most 56 Pa·s.

33. The thermosetting powder coating composition according to claim 26, wherein the amount of DFA in the polyester ranges from 1 to 11% w/w, and wherein the polyester has a viscosity of at most 56 Pa·s.

34. The thermosetting powder coating composition according to claim 27, wherein the amount of DFA in the polyester ranges from 1 to 11% w/w, and wherein the polyester has a viscosity of at most 56 Pa·s.

35. The thermosetting powder coating composition according to claim 28, wherein the amount of DFA in the polyester ranges from 1 to 11% w/w, and wherein the polyester has a viscosity of at most 56 Pa·s.

36. The thermosetting powder coating composition according to claim 29, wherein the amount of DFA in the polyester ranges from 1 to 11% w/w, and wherein the polyester has a viscosity of at most 56 Pa·s.

37. The thermosetting powder coating composition according to claim 30, wherein the amount of DFA in the polyester ranges from 1 to 11% w/w, and wherein the polyester has a viscosity of at most 56 Pa·s.

38. The thermosetting powder coating composition according to claim 31, wherein the amount of DFA in the polyester ranges from 1 to 11% w/w, and wherein the polyester has a viscosity of at most 56 Pa·s.

39. The thermosetting powder coating composition according to claim 2, wherein
   the amount of adipic acid in the polyester ranges from 1 to 10% w/w, and wherein
   the polyester has a viscosity of at most 56 Pa·s, and wherein either
      i) The DFA is present in the polyester in an amount from 8 to 11% w/w, when the DFA is 2-methyl-1,3-propanediol; or
      ii) the DFA is present in the polyester in an amount from 1 to 10% w/w, when the DFA is other than 2-methyl-1,3-propanediol.

40. The thermosetting powder coating composition according to claim 19, wherein
   the amount of adipic acid in the polyester ranges from 1 to 10% w/w, and
   wherein
   the polyester has a viscosity of at most 56 Pa·s,
   and wherein either
      i) the DFA is present in the polyester in an amount from 8 to 11% w/w, when the DFA is 2-methyl-1,3-propanediol; or
      ii) the DFA is present in the polyester in an amount from 1 to 10% w/w, when DFA is other than 2-methyl-1,3-propanediol.

41. The thermosetting powder coating composition according to claim 20, wherein
   the amount of adipic acid in the polyester ranges from 1 to 10% w/w, and
   wherein
   the polyester has a viscosity of at most 56 Pa·s,
   and wherein either
      i) the DFA is present in the polyester in an amount from 8 to 11% w/w, when the DFA is 2-methyl-1,3-propanediol; or
      ii) the DFA is present in the polyester in an amount from 1 to 10% w/w, when the DFA is other than 2-methyl-1,3-propanediol.

42. The thermosetting powder coating composition according to claim 21, wherein
   the amount of adipic acid in the polyester ranges from 1 to 10% w/w, and
   wherein
   the polyester has a viscosity of at most 56 Pa·s,
   and wherein either
      i) the DFA is present in the polyester in an amount from 8 to 11% w/w, when the DFA is 2-methyl-1,3-propanediol; or
      ii) the DFA is present in the polyester in an amount from 1 to 10% w/w, when the DFA is other than 2-methyl-1,3-propanediol.

43. The thermosetting powder coating composition according to claim 22, wherein
   the amount of adipic acid in the polyester ranges from 1 to 10% w/w, and
   wherein
   the polyester has a viscosity of at most 56 Pa·s,
   and wherein either
      i) the DFA is present in the polyester in an amount from 8 to 11% w/w, when the DFA is 2-methyl-1,3-propanediol; or
      ii) the DFA is present in the polyester in an amount from 1 to 10% w/w, when the DFA is other than 2-methyl-1,3-propanediol.

44. The thermosetting powder coating composition according to claim 1, wherein the DFA is present in the polyester in an amount from 1 to 5% w/w when the DFA is other than 2-methyl-1,3-propanediol, and wherein the amount of IPA in the polyester ranges from 7 to 30% w/w, and wherein the polyester has a viscosity of at most 56 Pa·s.

45. The thermosetting powder coating composition according to claim 1, wherein the DFA is present in the polyester in an amount from 1 to 5% w/w when the DFA is other than 2-methyl-1,3-propanediol, and wherein the amount of IPA in the polyester ranges from 7 to 30% w/w, and wherein the polyester has a viscosity of at most 56 Pa·s.

46. The thermosetting powder coating composition according to claim 19, wherein the DFA is present in the polyester in an amount from 1 to 5% w/w when the DFA is other than 2-methyl-1,3-propanediol, and wherein the amount of IPA in the polyester ranges from 7 to 30% w/w, and wherein the polyester has a viscosity of at most 56 Pa·s.

47. The thermosetting powder coating composition according to claim 20, wherein the DFA is present in the polyester in an amount from 1 to 5% w/w when the DFA is other than 2-methyl-1,3-propanediol, and wherein the amount of IPA in the polyester ranges from 7 to 30% w/w, and wherein the polyester has a viscosity of at most 56 Pa·s.

48. The thermosetting powder coating composition according to claim 21, wherein the DFA is present in the polyester in an amount from 1 to 5% w/w when the DFA is other than 2-methyl-1,3-propanediol, and wherein the amount of IPA in the polyester ranges from 7 to 30% w/w, and wherein the polyester has a viscosity of at most 56 Pa·s.

49. The thermosetting powder coating composition according to claim 22, wherein the DFA is present in the polyester in an amount from 1 to 5% w/w when the DFA is other than 2-methyl-1,3-propanediol, and wherein the amount of IPA in the polyester ranges from 7 to 30% w/w, and wherein the polyester has a viscosity of at most 56 Pa·s.

50. The thermosetting powder coating composition according to claim 1, wherein the amount of the polyester is at least 90% w/w based on total amount of resins present in the thermosetting powder coating composition.

51. The thermosetting powder coating composition according to claim 1, wherein the thermosetting powder coating composition further comprises a processing additive of general formula $X_n$-$Y_m$, wherein n is an integer from 1 to 3 and m is an integer from 1 to 4, wherein the processing additive has a glass transition temperature ranging from 30 to 90° C., wherein Y is a polyester, polyacrylate or polyesterurethane, and wherein Y is connected via an ester bond to X, which is chosen from the group of phosphoric acid, phosphonic acid, sulphuric acid, sulphonic acid, sulfamine acid, boric acid, pyridine ethanol, 1,4,5,6,7,7-hexachlorobicyclo[2.2.1]-hept-5-ene-2,3-dicarboxylic acid (HET acid), maleic acid and combinations thereof, and wherein the processing additive is present in an amount of at least 0.5% w/w on the polyester.

52. The thermosetting powder coating composition according to claim 25, wherein the thermosetting powder coating composition further comprises a processing additive of general formula $X_n$-$Y_m$, wherein n is an integer from 1 to 3 and m is an integer from 1 to 4, wherein the processing additive has a glass transition temperature ranging from 30 to 90° C., wherein Y is a polyester, polyacrylate or polyesterurethane, and wherein Y is connected via an ester bond to X, which is chosen from the group of phosphoric acid, phosphonic acid, sulphuric acid, sulphonic acid, sulfamine acid, boric acid, pyridine ethanol, 1,4,5,6,7,7-hexachlorobicyclo[2.2.1]-hept-5-ene-2,3-dicarboxylic acid (HET acid), maleic acid and combinations thereof, and wherein the processing additive is present in an amount of at least 0.5% w/w on the polyester.

53. A powder coating obtained by curing of a thermosetting powder coating composition according to claim 1.

54. A powder coating obtained by curing of a thermosetting powder coating composition according to claim 52.

55. A substrate fully or partially coated with a thermosetting powder coating composition according to claim 1.

56. A substrate fully or partially coated with a thermosetting powder coating composition according to claim 52.

57. A substrate fully or partially coated with a powder coating obtained by curing of a thermosetting powder coating composition according to claim 1.

58. A substrate fully or partially coated with a powder coating obtained by curing of a thermosetting powder coating composition according to claim 52.

59. A process for coating a substrate comprising the steps of:
  i) applying the thermosetting powder coating composition according to claim 1 to a substrate such that the substrate is partially or fully coated with the thermosetting powder coating composition, and
  ii) heating the obtained partially or fully coated substrate for a time from 1 minute to 60 minutes, and to a temperature from 140° C. to 225° C. to thereby obtain a coating that is at least partially cured.

60. A product comprising the partially or fully coated substrate according to claim 57, wherein the product is a product for automotive applications, marine applications, aerospace applications, medical applications, defense applications, sports/recreational applications, architectural applications, bottling applications, household applications, or machinery applications.

61. A product comprising the partially or fully coated substrate according to claim 58, wherein the product is a product for automotive applications, marine applications, aerospace applications, medical applications, defense applications, sports/recreational applications, architectural applications, bottling applications, household applications, or machinery applications.

* * * * *